United States Patent
Nakaoka et al.

(10) Patent No.: US 11,988,916 B2
(45) Date of Patent: *May 21, 2024

(54) DISPLAY DEVICE

(71) Applicant: Japan Display Inc., Tokyo (JP)

(72) Inventors: Chikyu Nakaoka, Tokyo (JP); Masaaki Kabe, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,934

(22) Filed: Jun. 6, 2023

(65) Prior Publication Data
US 2023/0314864 A1  Oct. 5, 2023

Related U.S. Application Data

(63) Continuation of application No. 17/860,387, filed on Jul. 8, 2022, now Pat. No. 11,709,390, which is a
(Continued)

(30) Foreign Application Priority Data

Apr. 16, 2019  (JP) .................................. 2019-077909

(51) Int. Cl.
*G02F 1/1335* (2006.01)
*G02F 1/1333* (2006.01)
*G02F 1/13357* (2006.01)

(52) U.S. Cl.
CPC .. *G02F 1/133504* (2013.01); *G02F 1/133354* (2021.01); *G02F 1/133512* (2013.01);
(Continued)

(58) Field of Classification Search
None
See application file for complete search history.

(56) References Cited

U.S. PATENT DOCUMENTS 11,415,828 B2 *  8/2022  Nakaoka ........... G02F 1/133512
11,709,390 B2 *  7/2023  Nakaoka ........... G02F 1/133567
349/62
(Continued)

FOREIGN PATENT DOCUMENTS

EP          0752600 A2    1/1997
JP          10-149110 A   6/1998

OTHER PUBLICATIONS

Notice of Reasons for Refusal dated Oct. 18, 2022, in corresponding Japanese Application No. 2019-077909, 8 pages.

*Primary Examiner* — Phu Vu
(74) *Attorney, Agent, or Firm* — Maier & Maier, PLLC

(57) ABSTRACT

According to one embodiment, a display device includes a display panel that includes a display portion including pixels and a non-display portion including an opening, an illumination device, and a color separation element provided between the display panel and the illumination device. The color separation element includes a first element overlapping the pixel and a second element overlapping the opening, the first element separates illumination light from the illumination device into light of a plurality of colors and irradiates the pixel with the light, and the second element separates illumination light from the illumination device into light of a plurality of colors and irradiates the opening with the light.

8 Claims, 21 Drawing Sheets

Related U.S. Application Data continuation of application No. 17/450,604, filed on Oct. 12, 2021, now Pat. No. 11,415,828, which is a continuation of application No. PCT/JP2020/006897, filed on Feb. 20, 2020.

(52) U.S. Cl.
CPC .. *G02F 1/133567* (2021.01); *G02F 1/133602* (2013.01); *G02F 1/133621* (2013.01); *G02F 1/133528* (2013.01); *G02F 2201/305* (2013.01); *G02F 2202/28* (2013.01)

(56) References Cited

U.S. PATENT DOCUMENTS

| | | |
|---|---|---|
| 2018/0306965 A1 | 10/2018 | Fattal |
| 2019/0043452 A1 | 2/2019 | Silvanto et al. |
| 2020/0271991 A1 | 8/2020 | Yang et al. |

\* cited by examiner

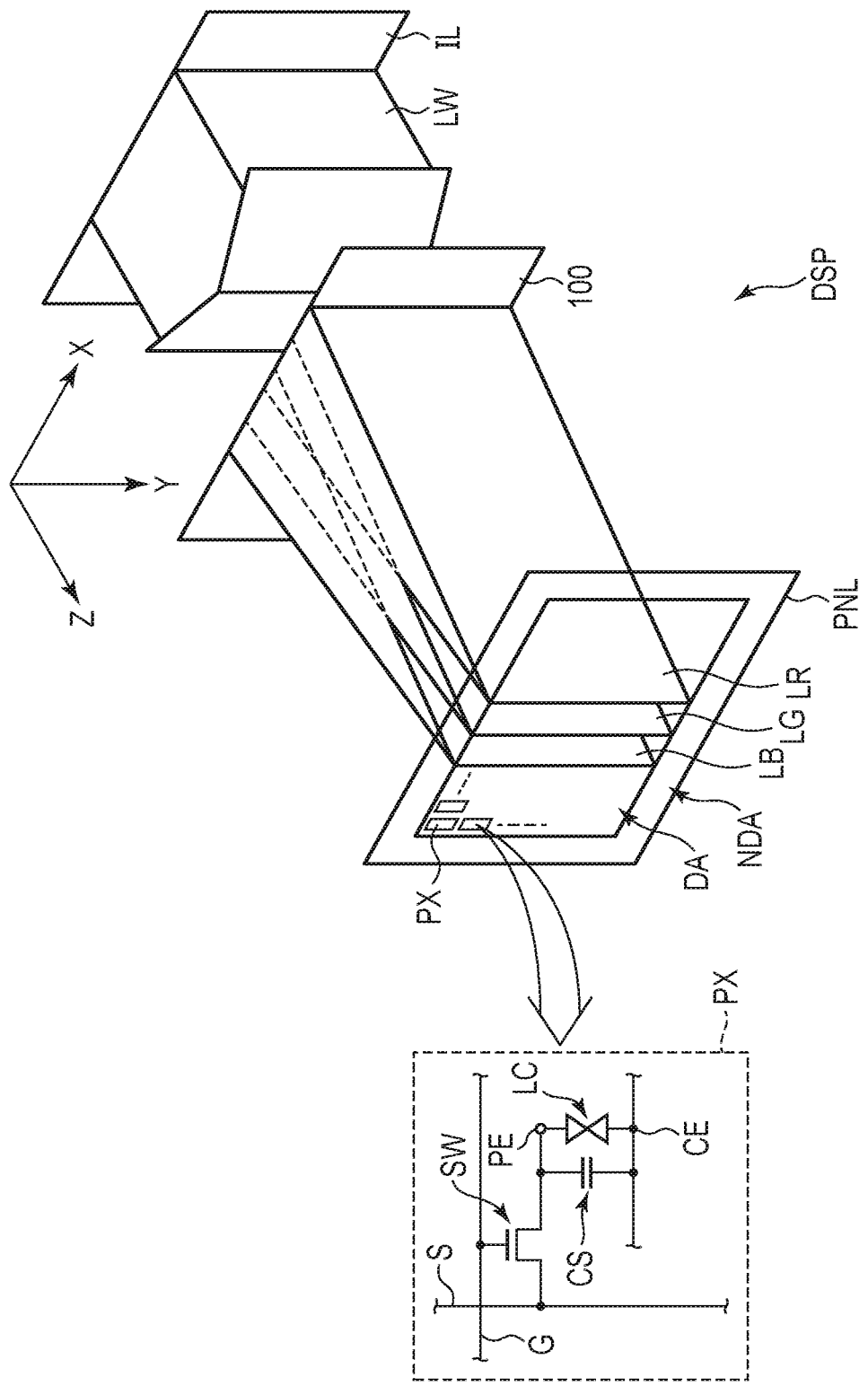
F I G. 1

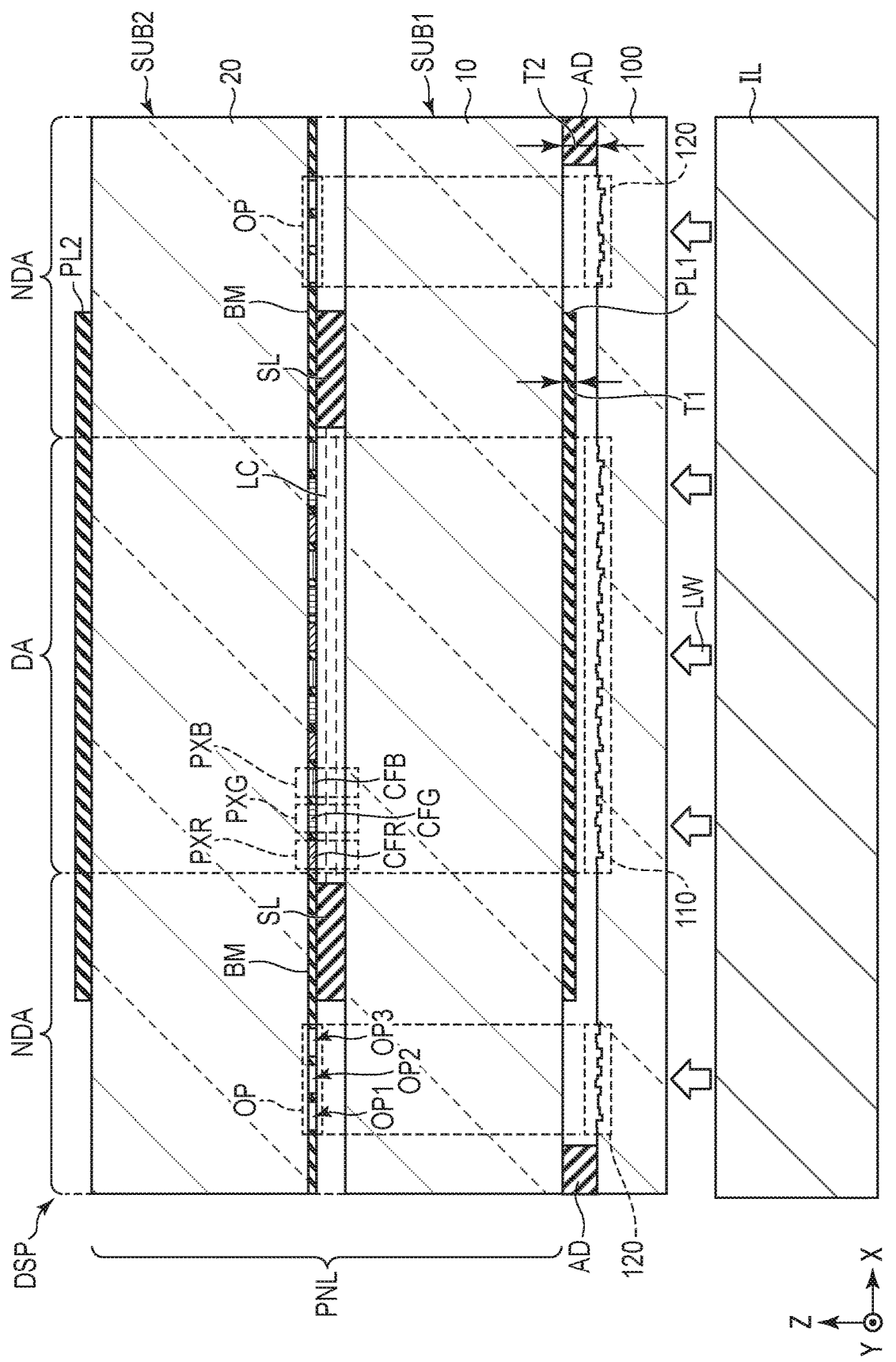
F I G. 2

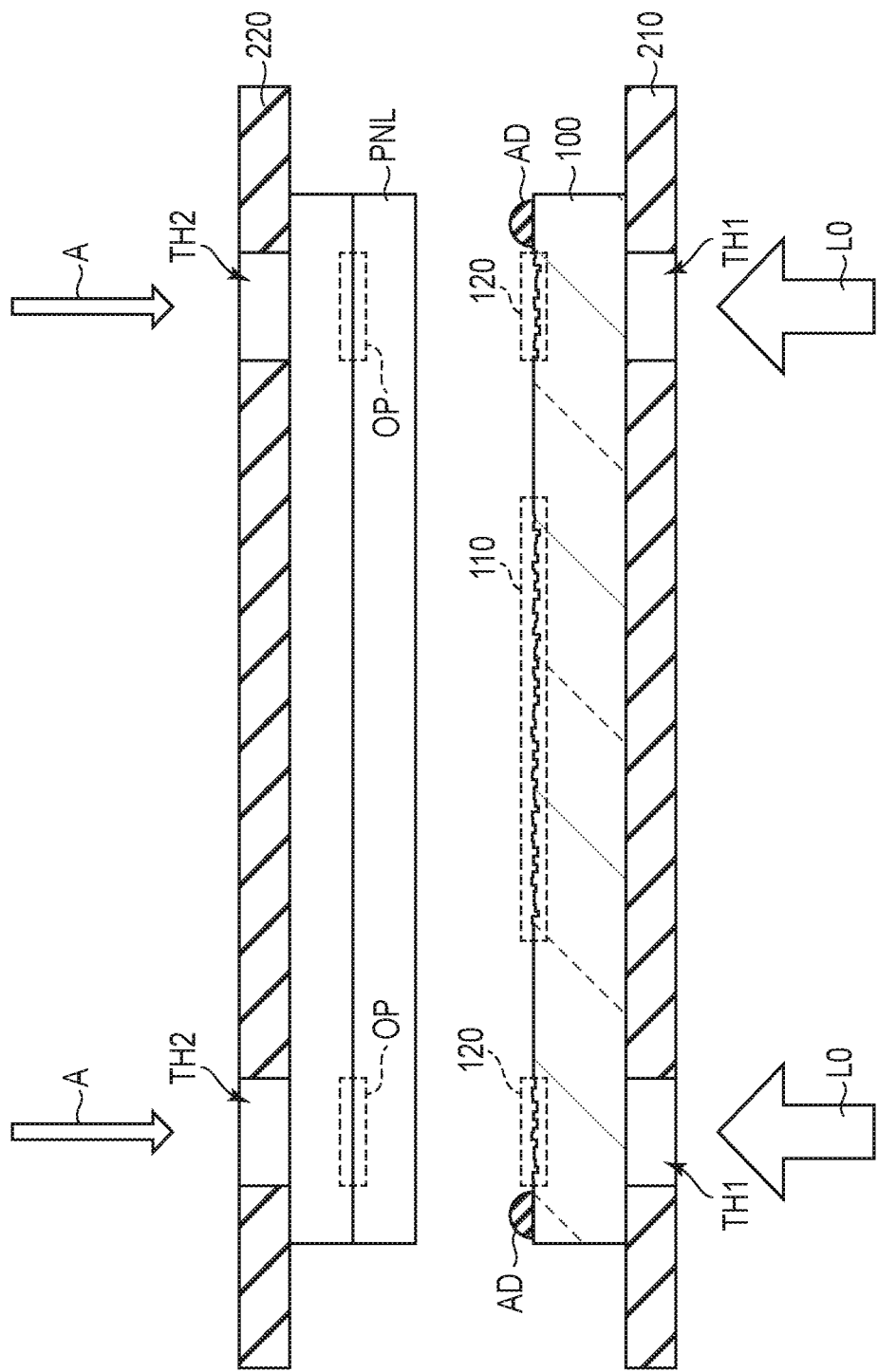
F I G. 4

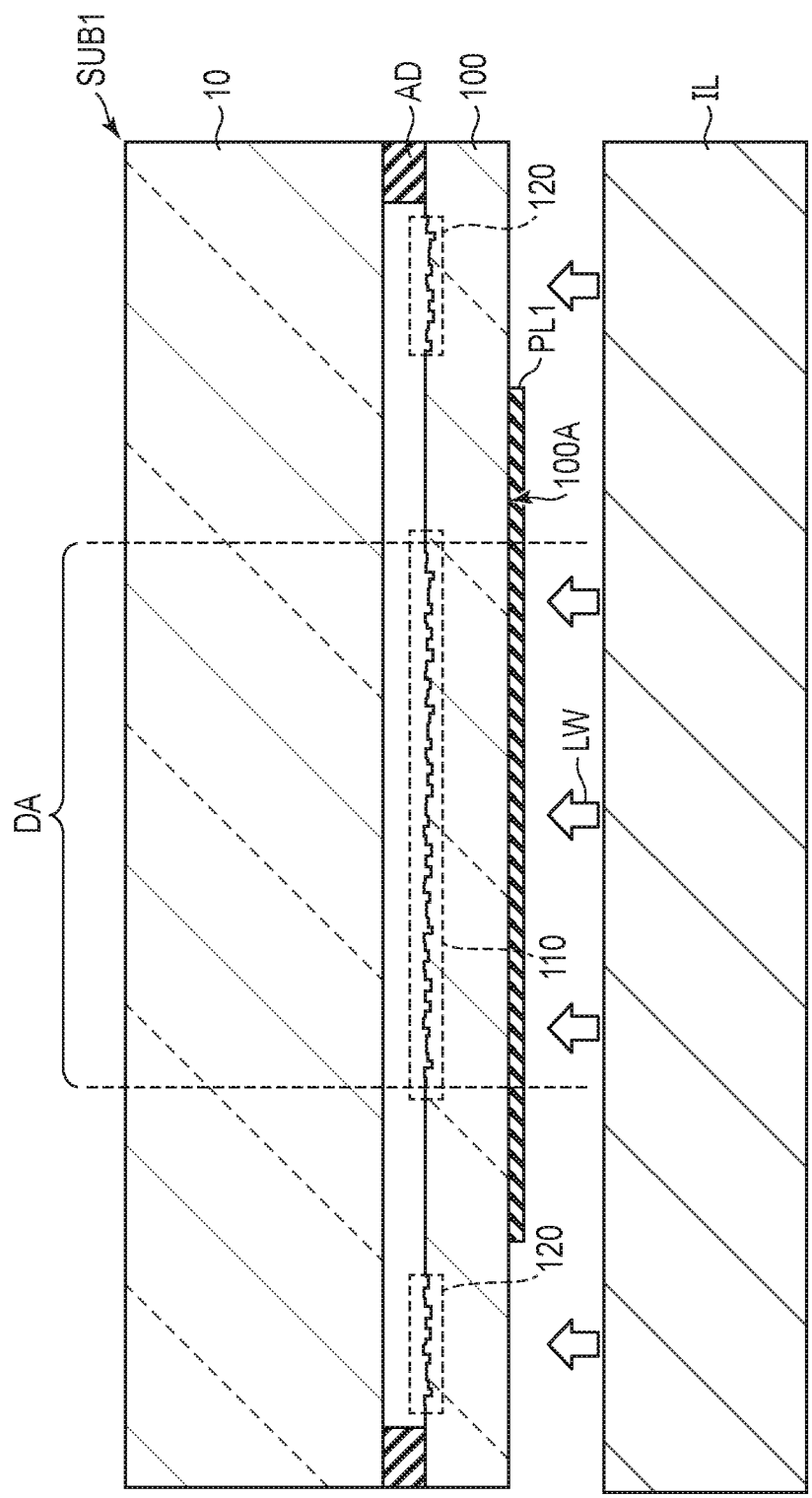
F I G. 8

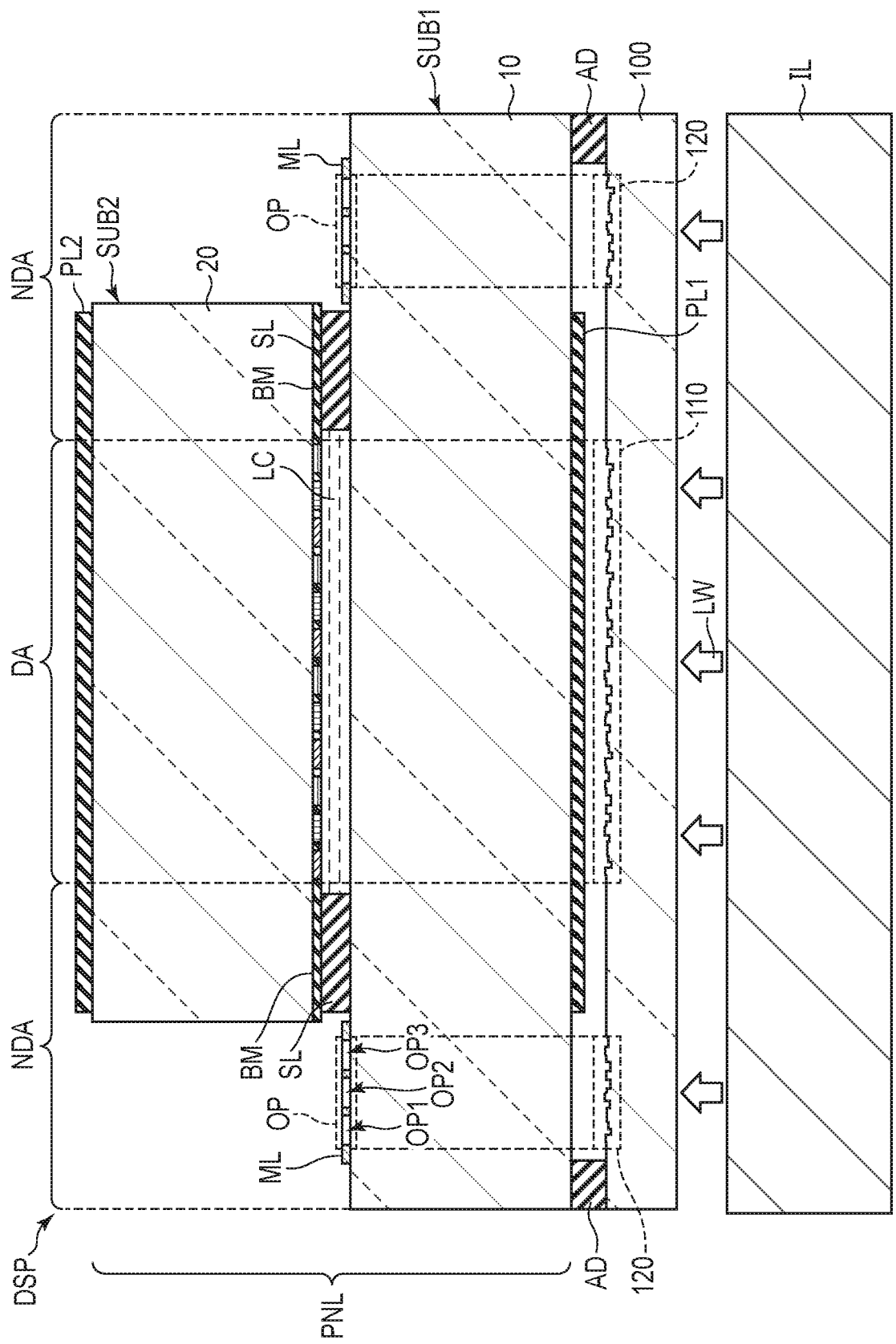
F I G. 14

1

DISPLAY DEVICE

CROSS-REFERENCE TO RELATED APPLICATIONS

This application is a Continuation of U.S. application Ser. No. 17/860,387, filed Jul. 8, 2022, which is a Continuation of U.S. application Ser. No. 17/450,604, filed Oct. 12, 2021, which is a Continuation application of PCT Application No. PCT/JP2020/006897, filed Feb. 20, 2020, and based upon and claiming the benefit of priority from Japanese Patent Application No. 2019-077909, filed Apr. 16, 2019, the entire contents of all of which are incorporated herein by reference.

FIELD

Embodiments described herein relate generally to a display device.

BACKGROUND

For example, in a liquid crystal display device, a pair of substrates is aligned based on alignment marks formed on both substrates, and then bonded to each other. At this time, since both alignment marks are separated in a focal depth direction, it is difficult to perform alignment with an error of several microns order while simultaneously observing both alignment marks.

In order to solve such a problem, for example, a display device including a first substrate on which an alignment mark is formed and a second substrate on which a focus lens is provided has been proposed. According to such a display device, incident light is focused on the alignment mark by the focus lens, a focused image is formed on a graduation line of the alignment mark, and alignment is performed while observing the focused image and the alignment mark.

BRIEF DESCRIPTION OF THE DRAWINGS

FIG. 1 is a diagram illustrating a configuration example of a display device DSP of a present embodiment.

FIG. 2 is a cross-sectional view illustrating a display device DSP of a first configuration example.

FIG. 4 is a diagram for explaining a method of aligning a display panel PNL and the color separation element 100.

FIG. 8 is a cross-sectional view illustrating a display device DSP of a third configuration example.

FIG. 14 is a cross-sectional view illustrating a display device DSP of a ninth configuration example.

DETAILED DESCRIPTION

Figure 3:
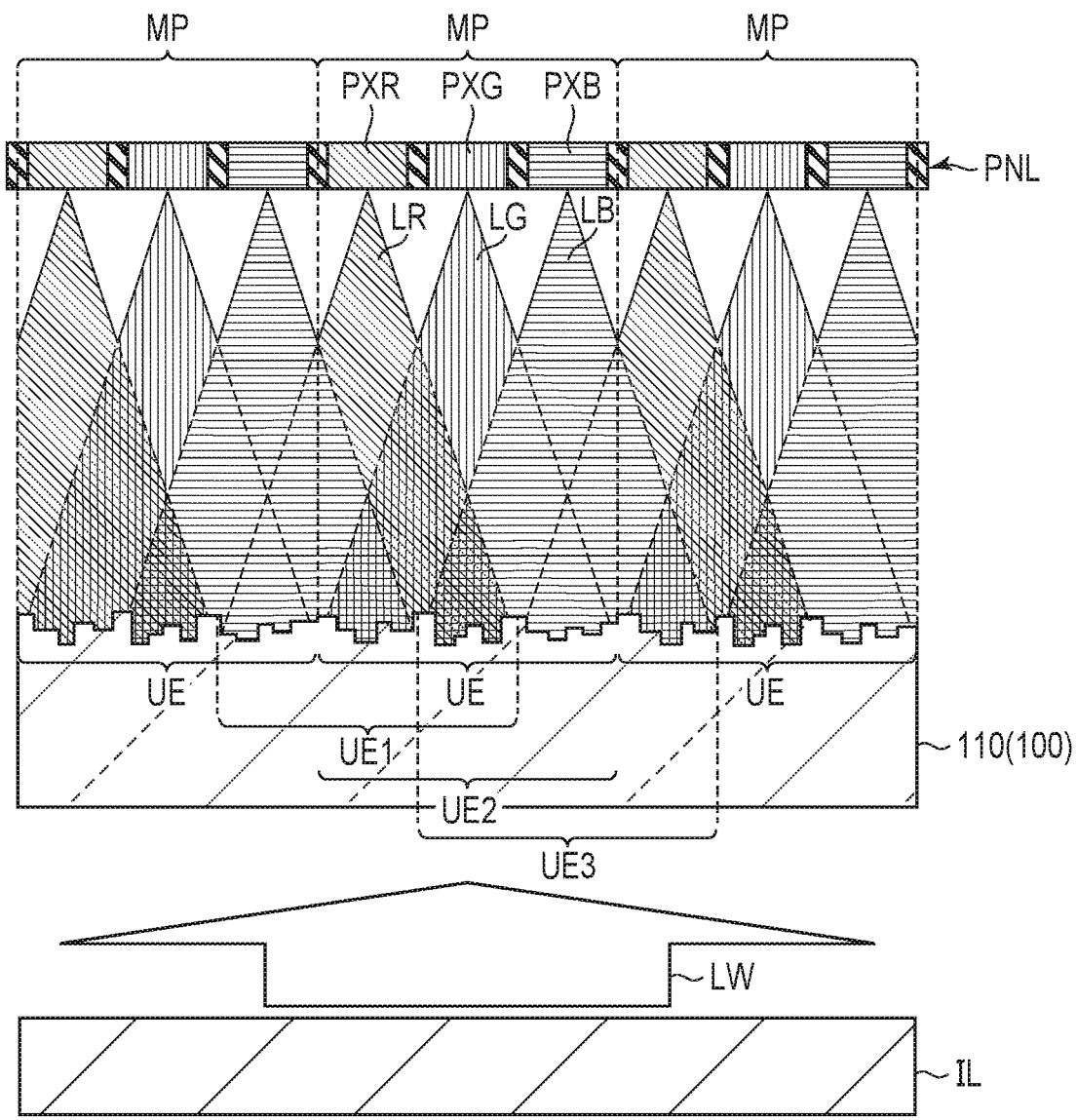
FIG. 3 is a diagram for explaining a concept of color separation by a first element 110 of a color separation element 100.

In general, according to one embodiment, there is provided a display device comprising a display panel that includes a display portion including a plurality of pixels and a non-display portion surrounding the display portion, an illumination device configured to illuminate the display panel, and a color separation element provided between the display panel and the illumination device, wherein the display panel includes an opening in the non-display portion, the color separation element includes a first element overlapping the pixel and a second element overlapping the opening, the first element separates illumination light from the illumination device into light of a plurality of colors and irradiates the pixel with the light, and the second element separates illumination light from the illumination device into light of a plurality of colors and irradiates the opening with the light.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

FIG. 1 is a plan view of an example of a display device DSP of the first embodiment. For example, a first direction X, a second direction Y and a third direction Z are orthogonal to each other, but they may intersect at an angle other than 90 degrees. The first direction X and the second direction Y correspond to the directions parallel to the main surface of the substrate constituting the display device DSP, and the third direction Z corresponds to the thickness direction of the display device DSP. Further, in an assumption that an observation position for observing the display device DSP is located on the tip side of the arrow indicating the third direction Z, when looking from this observation position toward an X-Y plane defined by the first direction X and the second direction Y is referred to as planar view.

The display device DSP includes a display panel PNL, an illumination device IL, and a color separation element 100. The illumination device IL, the color separation element 100, and the display panel PNL are arranged in this order along a third direction Z. That is, the color separation element 100 is provided between the illumination device IL and the display panel PNL.

The display panel PNL is, for example, a liquid crystal panel. The display panel PNL includes a display portion DA configured to display an image and a frame-shaped non-display portion NDA that surrounds the display portion DA. The display portion DA includes a plurality of pixels PX arrayed in a matrix in a first direction X and a second direction Y.

As illustrated in an enlarged manner in FIG. 1, each pixel PX includes a switching element SW, a pixel electrode PE, a common electrode CE, a liquid crystal layer LC, and the like. The switching element SW is electrically connected to a scanning line G and a signal line S. The pixel electrode PE is electrically connected to the switching element SW. The common electrode CE is provided in common for the plurality of pixel electrodes PE. The liquid crystal layer LC is driven by an electric field generated between the pixel electrode PE and the common electrode CE. A capacitance CS is formed, for example, between an electrode having a same electric potential as the common electrode CE and an electrode having a same electric potential as the pixel electrode PE.

The illumination device IL is configured to illuminate the display panel PNL. The illumination device IL emits an illumination light LW substantially parallel along the third direction Z toward the color separation element 100. The illumination light LW is, for example, white light.

The color separation element 100 is configured to separate the illumination light LW into a plurality of colors. In one example, the color separation element 100 separates the illumination light LW into a blue light LB, a green light LG, and a red light LR, and emits the lights toward the display panel PNL. The separated blue light LB, green light LG, and red light LR are arranged, for example, in the first direction X and are focused linearly along the second direction Y.

First Configuration Example

FIG. 2 is a cross-sectional view illustrating a display device DSP of a first configuration example. A display panel PNL includes a first substrate SUB1, a second substrate SUB2, and a liquid crystal layer LC. The first substrate SUB1 and the second substrate SUB2 are bonded to each other by sealant SL in a non-display portion NDA. The liquid crystal layer LC is located between the first substrate SUB1 and the second substrate SUB2, and is sealed by the sealant SL. Such a display panel PNL includes, as pixels PX, for example, a pixel PXR displaying red, a pixel PXG displaying green, and a pixel PXB displaying blue in a display portion DA. The pixels PXR, PXG, and PXB are arranged in the first direction X. The display panel PNL includes openings OP in the non-display portion NDA.

In the example illustrated in FIG. 2, only transparent substrate 10 constituting the first substrate SUB1 is illustrated, but the first substrate SUB1 includes a scanning line G, a signal line S, a switching element SW, a pixel electrode PE, and the like illustrated in FIG. 1 in each of pixels PXR, PXG, and PXB. The first substrate SUB1 includes a transparent insulating film and an alignment film (not illustrated) between the transparent substrate 10 and liquid crystal layer LC. The second substrate SUB2 includes a transparent substrate 20, color filters CFR, CFG, CFB, and a light-shielding layer BM. The second substrate SUB2 includes an alignment film (not illustrated) between the transparent substrate 20 and the liquid crystal layer LC. The transparent substrates 10 and 20 are insulating substrates such as a glass substrate and a flexible resin substrate. The red color filter CFR is provided in the pixel PXR, the green color filter CFG is provided in the pixel PXG, and the blue color filter CFB is provided in the pixel PXB. The light-shielding layer BM is provided between the adjacent color filters CFR, CFG, and CFB in the display portion DA. The light-shielding layer BM is also provided in the non-display portion NDA. Each of the openings OP is a through hole formed in the light-shielding layers BM outside the sealant SL. In the example illustrated in FIG. 2, the opening OP includes a first opening OP1, a second opening OP2, and a third opening OP3. The first to third openings OP1 to OP3 are arranged in the first direction X.

The color separation element 100 is provided between an illumination device IL and the first substrate SUB1. The first substrate SUB1 is provided between the color separation element 100 and the second substrate SUB2. The color separation element 100 includes a first element 110 and second elements 120. The first element 110 is provided so as to overlap the pixels PXR, PXG, and PXB in the third direction Z. The second elements 120 each are provided so as to overlap the first to third openings OP1 to OP3 of the opening OP in the third direction Z. The first substrate SUB1 does not include a light-shielding member such as a metal wiring or an electrode between the second elements 120 and the openings OP.

Each of the first element 110 and the second element 120 is a diffraction element having an uneven shape in the third direction Z. The first element 110 and the second element 120 are formed on a same plane side in the color separation element 100, for example, and are formed on a side facing the first substrate SUB1 in the example illustrated in FIG. 2. Such a color separation element 100 is bonded to the first substrate SUB1 by an adhesive AD. When the adhesive AD and the sealant SL are opaque or have light scattering properties, the first element 110 and the second element 120 are provided so as not to overlap any of the sealant SL and the adhesive AD in the third direction Z. In the example illustrated in FIG. 2, each of the second elements 120 is provided between the adhesive AD and the sealant SL in the first direction X.

The polarizing plate PL1 is provided between the color separation element 100 and the first substrate SUB1, and is bonded to the first substrate SUB1. The polarizing plate PL1 is provided over the display portion DA and overlaps the first element 110 in the third direction Z. The thickness T2 of the adhesive AD is larger than the thickness T1 of the polarizing plate PL1. Therefore, the polarizing plate PL1 is separated from the first element 110.

A polarizing plate PL2 is provided over the display portion DA and is bonded to the second substrate SUB2. The polarizing plates PL1 and PL2 are provided so as not to overlap the second elements 120 in the third direction Z.

In such a display device DSP, an illumination light LW from the illumination device IL is diffracted by the first element 110 and the second elements 120 and separated into light of a plurality of colors as illustrated in FIG. 1. For example, the first element 110 irradiates the blue pixel PXB, the green pixel PXG, and the red pixel PXR with the blue light LB, the green light LG, and the red light LR illustrated in FIG. 1, respectively. The second element 120 irradiates the first to third openings OP1 to OP3 of the opening OP with light of a plurality of colors, respectively. Details thereof will be described later.

FIG. 3 is a diagram for explaining a concept of color separation by a first element 110 of a color separation element 100. The first element 110 includes a plurality of unit elements UE arranged in one direction. A direction in which the plurality of unit elements UE are arranged is, for example, the above-described first direction X. Each of the unit elements UE has a same uneven shape. In other words, the first element 110 has a periodic uneven shape, and one cycle thereof constitutes a unit element UE. The unit element UE has a function of separating the illumination light LW into the blue light LB, the green light LG, and the red light LR when the illumination light LW is incident from the illumination device IL substantially perpendicularly to the color separation element 100. A first unit element UE1, a second unit element UE2, and a third unit element UE3 correspond to unit elements arranged with each shift of ⅓ period. The first unit element UE1 mainly diffracts and focuses the red light LR having a red wavelength among the illumination light LW. The second unit element UE2 mainly diffracts and focuses the green light LG having a green wavelength among the illumination light LW. The third unit element UE3 mainly diffracts and focuses the blue light LB having a blue wavelength among the illumination light LW. Note that, it goes without saying that these first to third unit elements UE1 to UE3 diffract not only light of the main wavelength but also light of other wavelengths.

The display panel PNL is arranged in a vicinity of a position where light of each color is focused by the color separation element 100. The display panel PNL includes a plurality of main pixels MP arranged in one direction. Each of the main pixels MP includes the pixels PXR, PXG, and PXB arranged in one direction. A direction in which the pixels PXR, PXG, and PXB are arranged is the same as a direction in which the unit elements UE are arranged. Each of the main pixels MP is arranged to be superimposed on one unit element UE. The focused red light LR is applied to the pixel PXR. The focused green light LG is applied to the pixel PXG. The focused blue light LB is applied to the pixel PXB.

Next, the second element 120 will be described. The second element 120 is used for alignment at a time of bonding the display panel PNL and the color separation element 100. Here, first, an example of an alignment method will be described.

FIG. 4 is a diagram for explaining a method of aligning a display panel PNL and the color separation element 100. The color separation element 100 is supported by a support 210. The support 210 has through holes TH1 each overlapping each of the second elements 120. The display panel PNL is supported by a support 220. The support 220 has through holes TH2 each overlapping each of the openings OP.

At the time of alignment, the first element 110 and the second elements 120 face the display panel PNL in a state where the color separation element 100 and the display panel PNL are separated from each other. When the support 210 is illuminated with a reference light L0 from a lower side (a side opposite to a side supporting the color separation element 100), the reference light L0 passes through the through holes TH1 and enters the second elements 120. The reference light L0 is parallel light, for example, white light, similarly to the above-described illumination light LW. The second element 120 separates the reference light L0 into a plurality of colors and focuses them.

On the other hand, the openings OP of the display panel PNL are observed with a microscope or the like through the through holes TH2 from a direction indicated by arrows A in the drawing. The display panel PNL and the color separation element 100 are aligned such that the light of each color separated by the second element 120 is focused at a predetermined position of the opening OP. Then, after the alignment is completed, the display panel PNL and the color separation element 100 are brought close to each other and bonded to each other by the adhesive AD.

Figure 5:
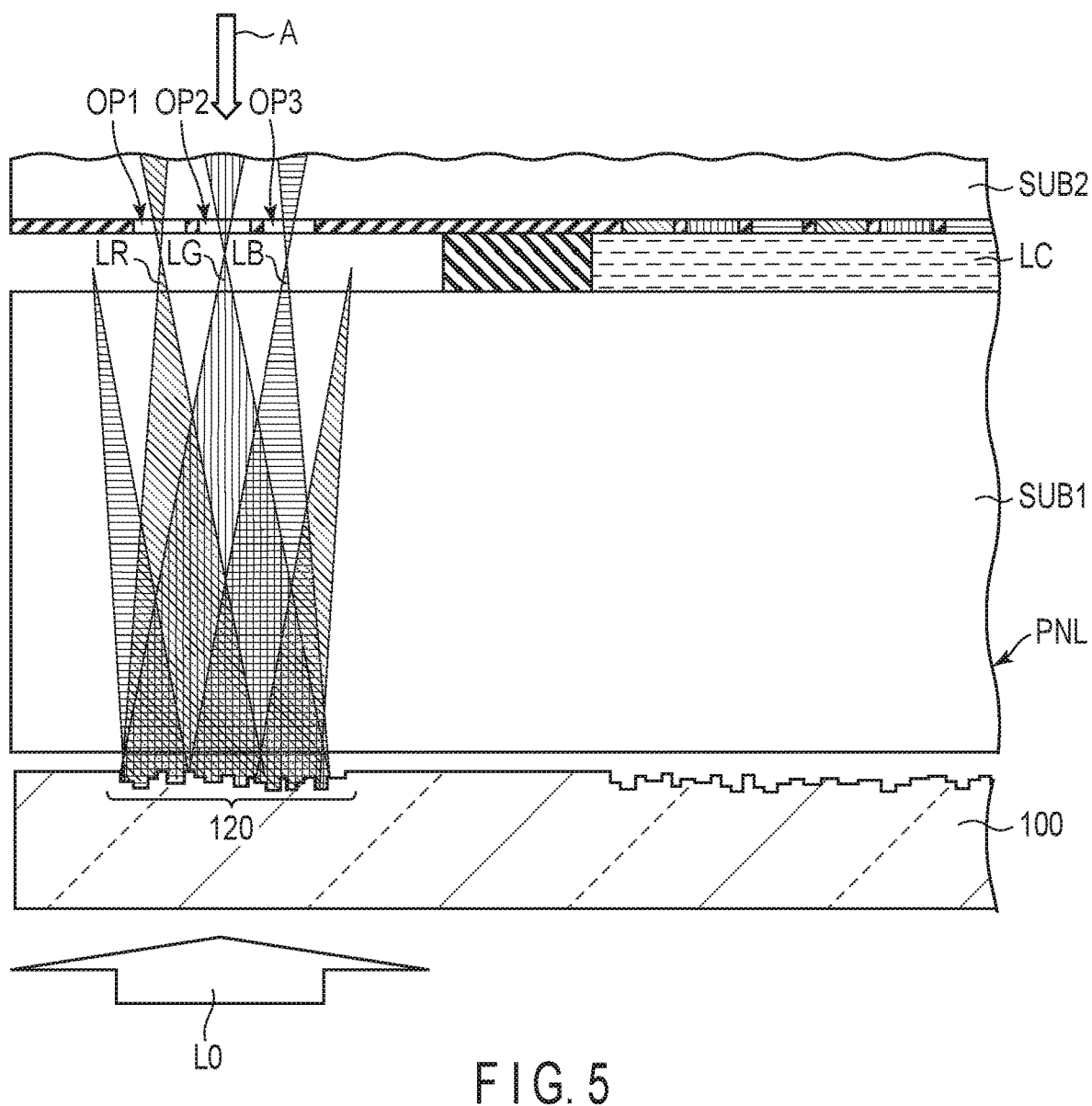
FIG. 5 is a diagram for explaining a concept of color separation by a second element 120 of the color separation element 100.

FIG. 5 is a diagram for explaining a concept of color separation by a second element 120 of the color separation element 100. The second element 120 has, for example, a same shape as one unit element UE (for one cycle) of the first element 110 illustrated in FIG. 3. Note that the second element 120 may have a same shape as one or more (one cycle or more) unit elements UE. The second element 120 separates the reference light L0 into the blue light LB, the green light LG, and the red light LR, and focuses them.

When the alignment between the display panel PNL and the color separation element 100 is completed, the red light LR focused in the display panel PNL is applied to the first opening OP1. The focused green light LG is applied to the second opening OP2. The focused blue light LB is applied to the third opening OP3. That is, a focal point of the second element 120 is set in a vicinity of the first to third openings OP1 to OP3.

Figure 6:
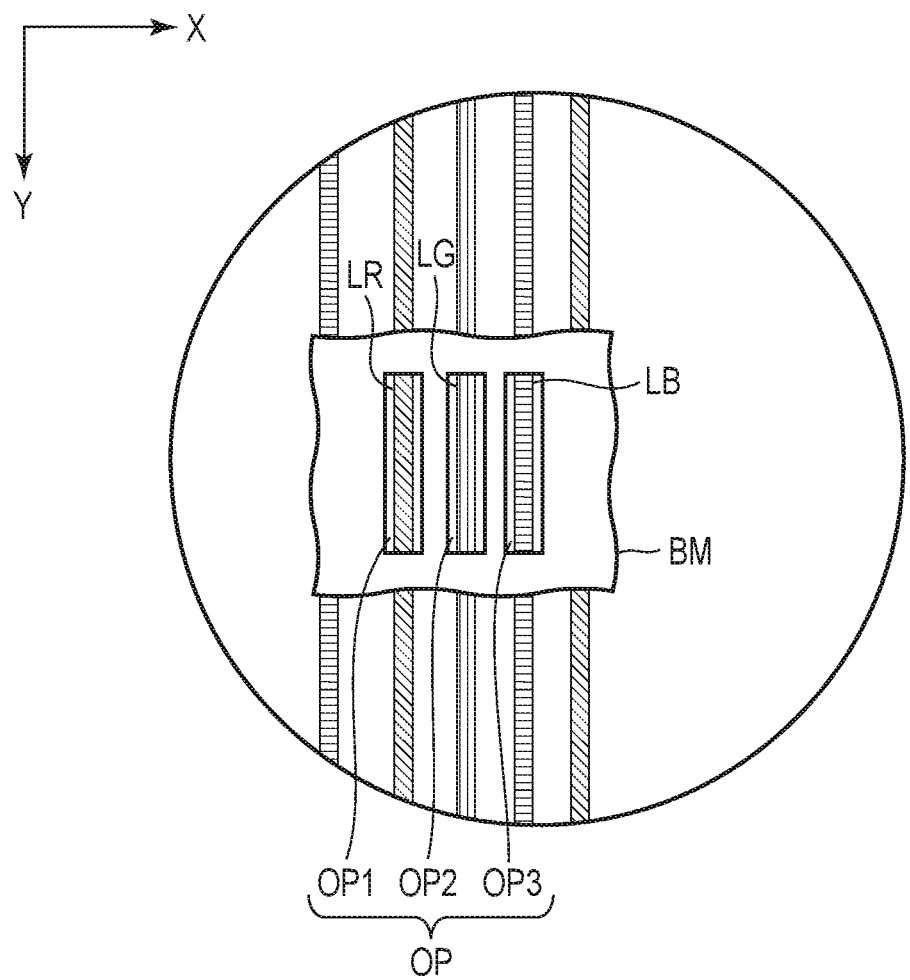
FIG. 6 is a diagram illustrating an example of a pattern observed when an opening OP is observed.

FIG. 6 is a diagram illustrating an example of a pattern observed when an opening OP is observed. In practice, the light-shielding layers BM of the display panel PNL is provided in substantially the entire region of the non-display portion NDA except for the openings OP, but here, a part of the light-shielding layers BM is illustrated for convenience of description.

The red light LR, the green light LG, and the blue light LB are focused linearly along the second direction Y. The first opening OP1, the second opening OP2, and the third opening OP3 are each formed in a slit shape (or a rectangular shape) extending in the second direction Y.

In a state where the alignment is completed, the focused red light LR is observed as a linear focused image at substantially the center of the first opening OP1. Similarly, the focused green light LG is observed as a linear focused image at substantially the center of the second opening OP2, and the focused blue light LB is observed as a linear focused image at substantially the center of the third opening OP3.

When the display panel PNL and the color separation element 100 are aligned, for example, it is assumed that an alignment mark provided on the first substrate SUB1 of the display panel PNL and an alignment mark provided on the color separation element 100 are observed with a microscope. In this case, these alignment marks are separated in a focal depth direction by a distance equal to or greater than the thickness of the first substrate SUB1. Therefore, it is difficult to simultaneously observe both alignment marks.

According to the present embodiment, the reference light L0 is separated into light of a plurality of colors by the color separation element 100, and the light of each color is focused in the opening OP of the display panel PNL. Therefore, by focusing the microscope on the opening OP, alignment can be performed while observing the focused image overlapping the opening OP. That is, the alignment between the color separation element 100 and the display panel PNL separated in the focal depth direction can be realized while being observed with a single focus microscope.

Furthermore, the second element 120 for alignment has the same shape as the unit element UE of the first element 110 that focuses light of a desired color to each of the pixels PXR, PXG, and PXB. Therefore, the second element 120 can focus light of a plurality of colors at intervals equivalent to a pixel pitch. As a result, alignment can be accurately performed within a tolerance range on the order of microns.

Next, another configuration example will be described. The following second to seventh configuration examples will be described focusing on the first substrate SUB1 of the display panel PNL, the color separation element 100, and the polarizing plate PL1. Although illustration of the liquid crystal layer LC, the second substrate SUB2, and the like is omitted, the structure of the display panel PNL is similar to that of the first configuration example illustrated in FIG. 2.

Second Configuration Example

Figure 7:
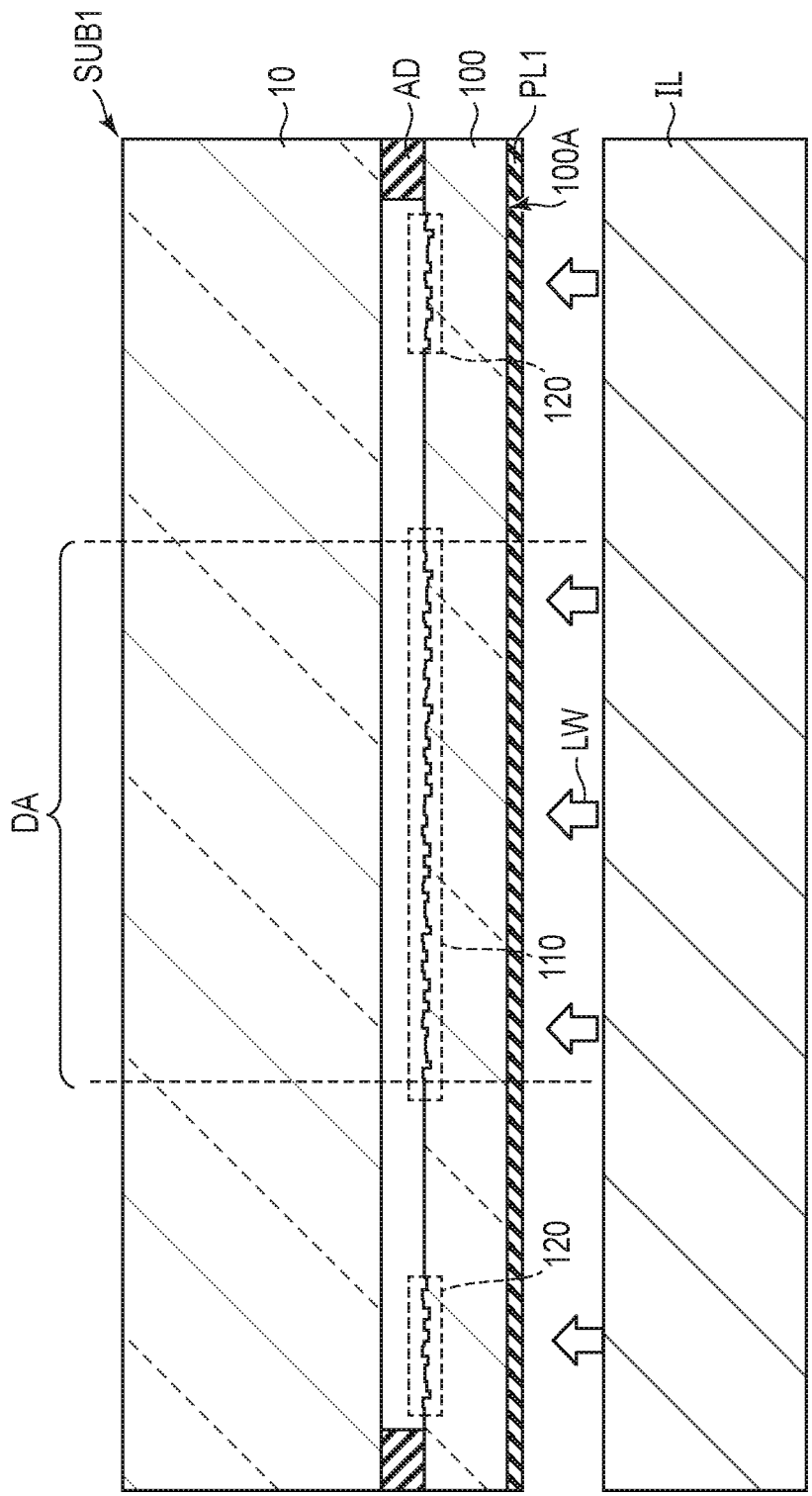
FIG. 7 is a cross-sectional view illustrating a display device DSP of a second configuration example.

FIG. 7 is a cross-sectional view illustrating a display device DSP of a second configuration example. The second configuration example illustrated in FIG. 7 is different from the first configuration example illustrated in FIG. 2 in that a color separation element 100 is provided between a polarizing plate PL1 and a first substrate SUB1. The color separation element 100 is bonded to a first substrate SUB1 by an adhesive AD. In the color separation element 100, a first element 110 and a second element 120 are formed on a side facing the first substrate SUB1. The color separation element 100 has a plane surface 100A on a side opposite to the first element 110 and the second element 120.

The polarizing plate PL1 is located between an illumination device IL and the color separation element 100, and is bonded to a plane surface 100A of the color separation element 100. In the second configuration example, the polarizing plate PL1 is provided on the entire surface of the plane surface 100A.

Even in this second configuration example, the same effect as described above can be obtained.

Third Configuration Example

FIG. 8 is a cross-sectional view illustrating a display device DSP of a third configuration example. The third configuration example illustrated in FIG. 8 is different from the second configuration example illustrated in FIG. 7 in that a polarizing plate PL1 is provided in a region overlapping a display portion DA on a plane surface 100A. Further, the polarizing plate PL1 does not overlap second elements 120 in the third direction Z.

Even in this third configuration example, the same effect as described above can be obtained. In addition, since the second elements 120 do not overlap the polarizing plate PL1, it is possible to prevent a part of the light traveling toward the second elements 120 from being absorbed by the polarizing plate PL1.

Fourth Configuration Example

Figure 9:
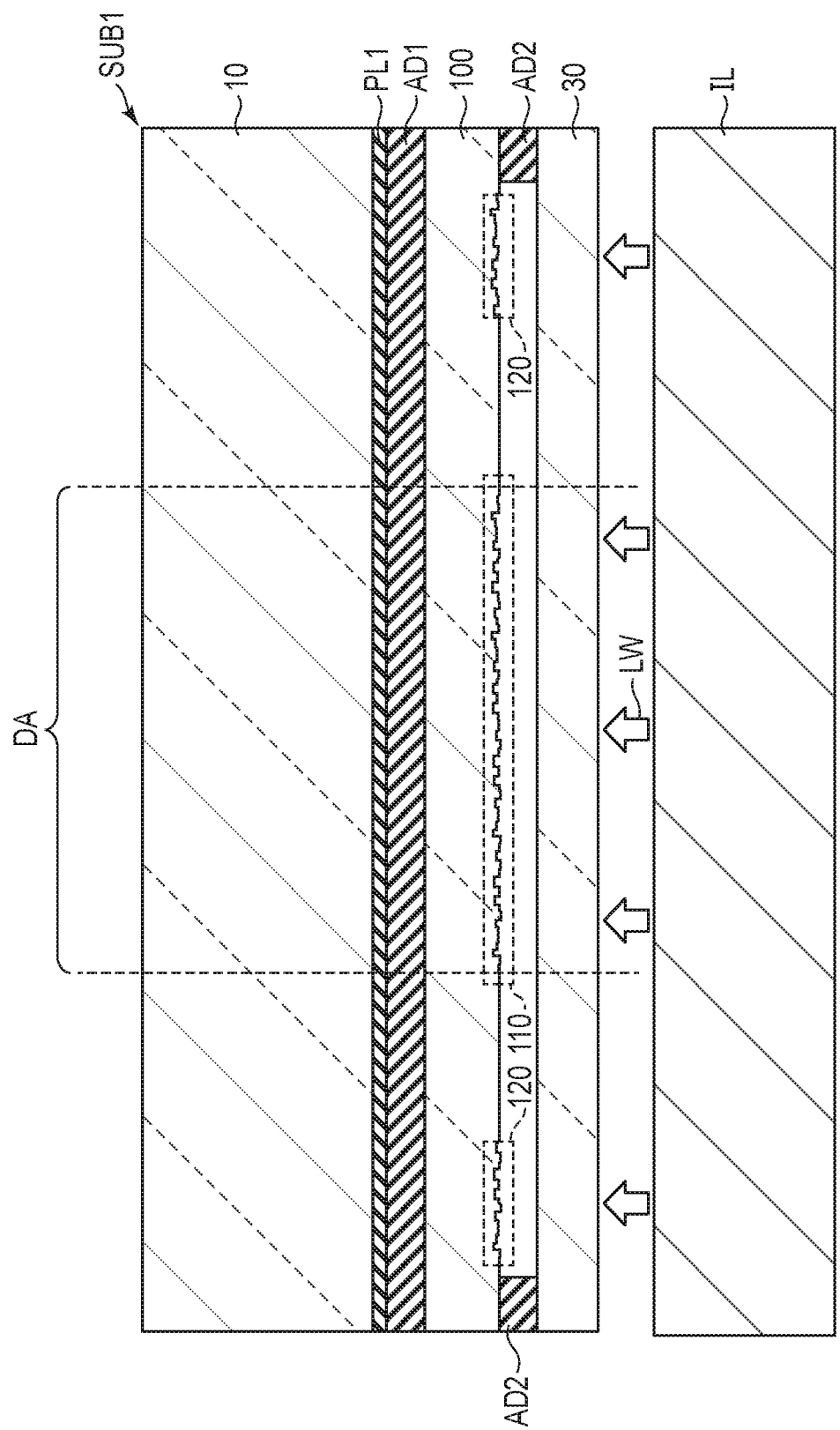
FIG. 9 is a cross-sectional view illustrating a display device DSP of a fourth configuration example.

FIG. 9 is a cross-sectional view illustrating a display device DSP of a fourth configuration example. The fourth configuration example illustrated in FIG. 9 is different from the first configuration example illustrated in FIG. 2 in that a first element 110 and a second element 120 are formed on an opposite side of a side facing a first substrate SUB1 on a color separation element 100. That is, the first element 110 and the second element 120 are provided so as to face an illumination device IL side. A polarizing plate PL1 is provided between the color separation element 100 and the first substrate SUB1. In the example illustrated in FIG. 9, the polarizing plate PL1 is bonded to a transparent substrate 10, but may be bonded to the color separation element 100.

In the color separation element 100, the plane surface 100A faces the polarizing plate PL1 and is bonded to the polarizing plate PL1 by a transparent adhesive AD1. A protective material 30 is provided between the illumination device IL and the color separation element 100, and is bonded to the color separation element 100 by an adhesive AD2. The protective material 30 is a transparent substrate such as a glass substrate or a plastic substrate. The protective material 30 is provided so as to be separated from the first element 110 and the second element 120 while facing the first element 110 and the second element 120, and protects the first element 110 and the second element 120. The illumination device IL may be bonded to the protective material 30.

Even in this fourth configuration example, the same effect as described above can be obtained. In addition, since the illumination device IL is bonded to the protective material 30, the illumination device IL and the display panel PNL can be arranged close to each other. In addition, even when the illumination device IL and the display panel PNL are close to each other, damage to the first element 110 and the second element 120 can be suppressed by the protective material 30.

Fifth Configuration Example

Figure 10:
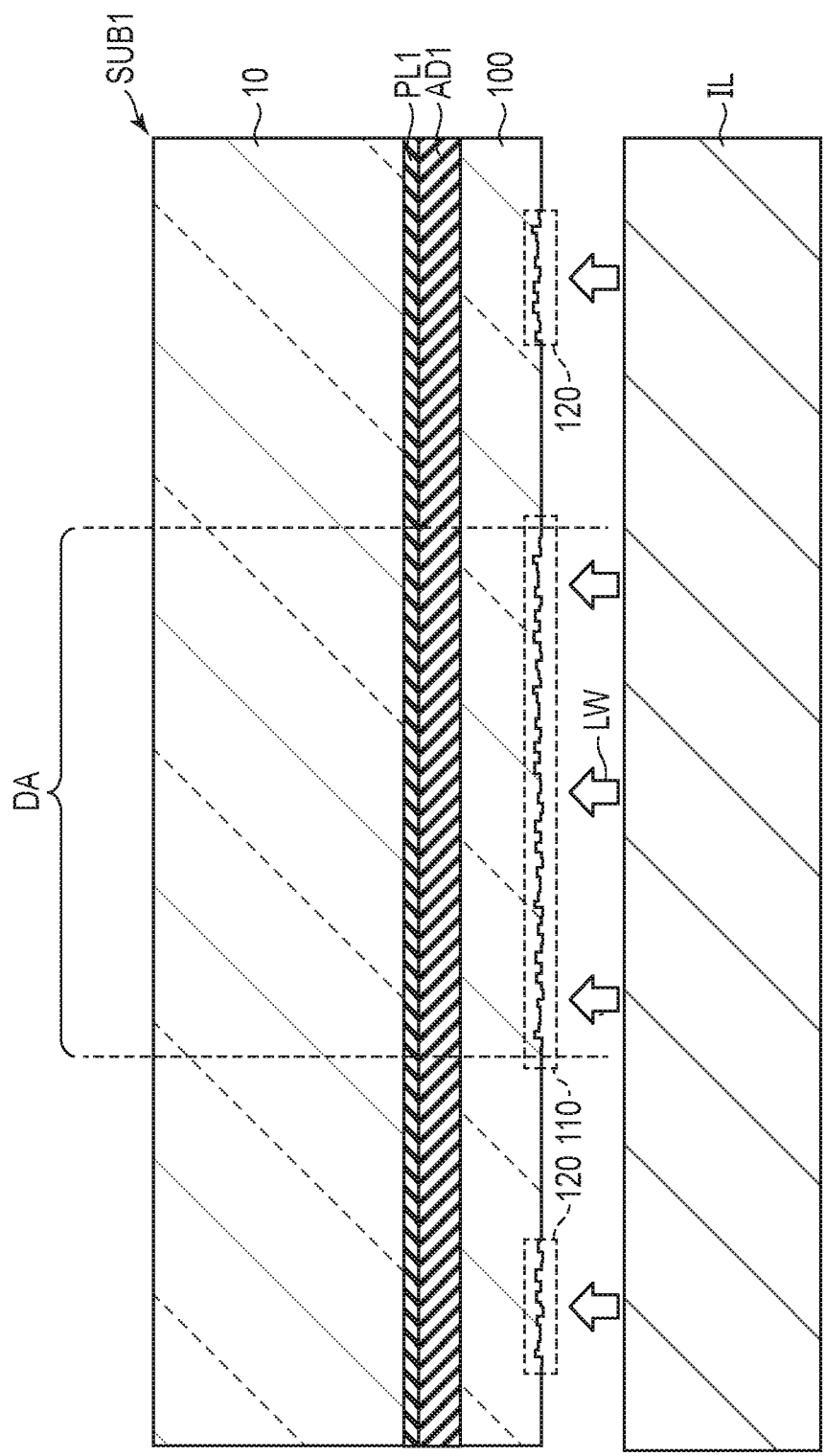
FIG. 10 is a cross-sectional view illustrating a display device DSP of a fifth configuration example.

FIG. 10 is a cross-sectional view illustrating a display device DSP of a fifth configuration example. The fifth configuration example illustrated in FIG. 10 is different from the fourth configuration example illustrated in FIG. 9 in that the protective material 30 is omitted.

Even in this fifth configuration example, the same effect as described above can be obtained. In addition, the number of components can be reduced, and cost can be reduced. Such a fifth configuration example is suitable, for example, when an illumination device IL is disposed away from the color separation element 100.

Sixth Configuration Example

Figure 11:
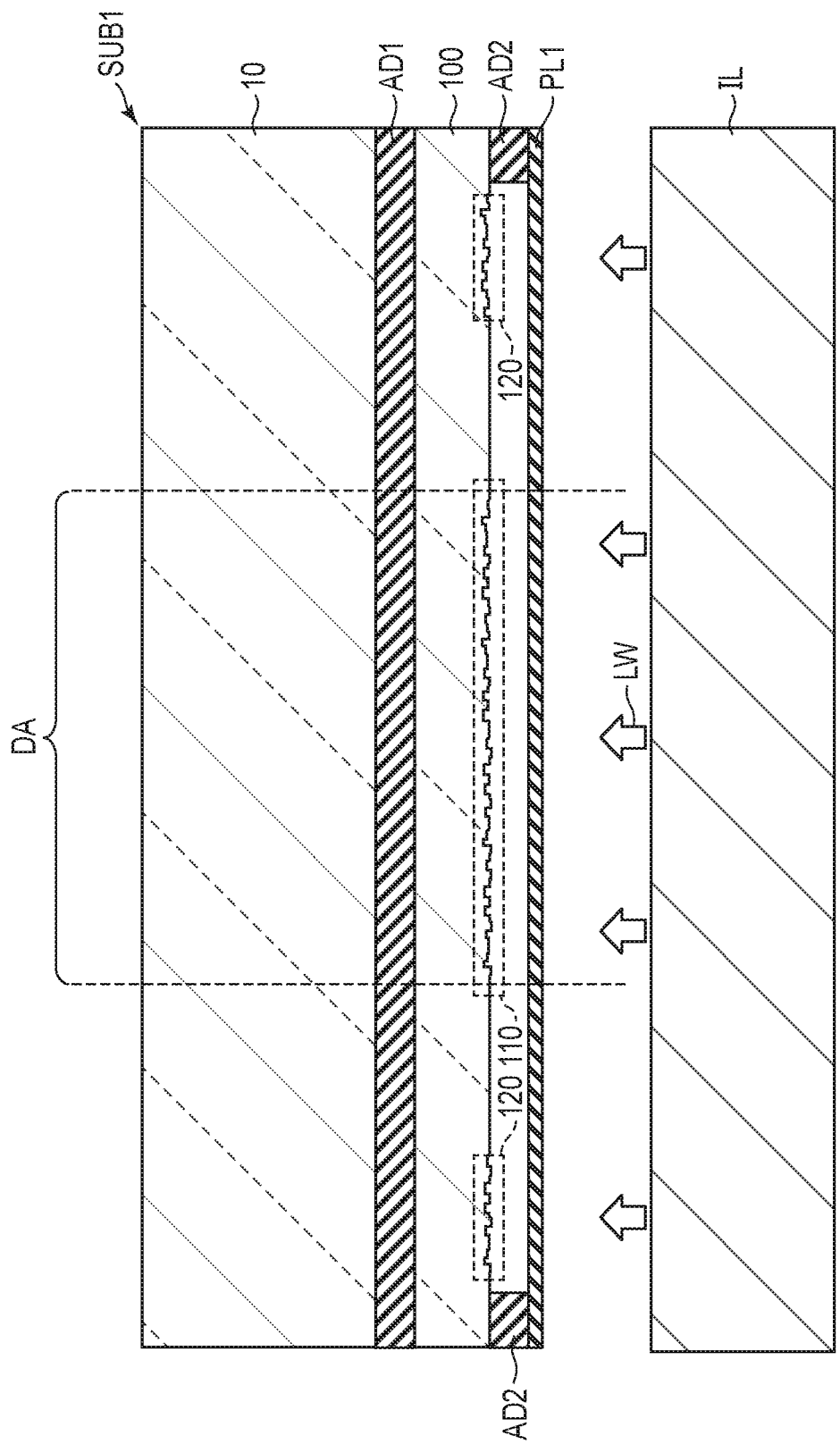
FIG. 11 is a cross-sectional view illustrating a display device DSP of a sixth configuration example.

FIG. 11 is a cross-sectional view illustrating a display device DSP of a sixth configuration example. The sixth configuration example illustrated in FIG. 11 is different from the fourth configuration example illustrated in FIG. 9 in that a color separation element 100 is provided between a polarizing plate PL1 and a first substrate SUB1. The color separation element 100 is bonded to the first substrate SUB1 by an adhesive AD1. The polarizing plate PL1 is located between an illumination device IL and the color separation element 100, and is bonded to the color separation element 100 by an adhesive AD2.

In other words, the polarizing plate PL1 is replaced with the protective material 30 described in the fourth configuration example. The polarizing plate PL1 is provided so as to be separated from a first element 110 and a second element 120 and face the first element 110 and the second element 120, and protects the first element 110 and the second element 120. Note that the polarizing plate PL1 is separated from the color separation element 100 in a region overlapping a display portion DA, and desirably has high rigidity from a viewpoint of suppressing deterioration of optical characteristics due to deformation, and the like.

Even in this sixth configuration example, the same effect as described above can be obtained.

Seventh Configuration Example

Figure 12:
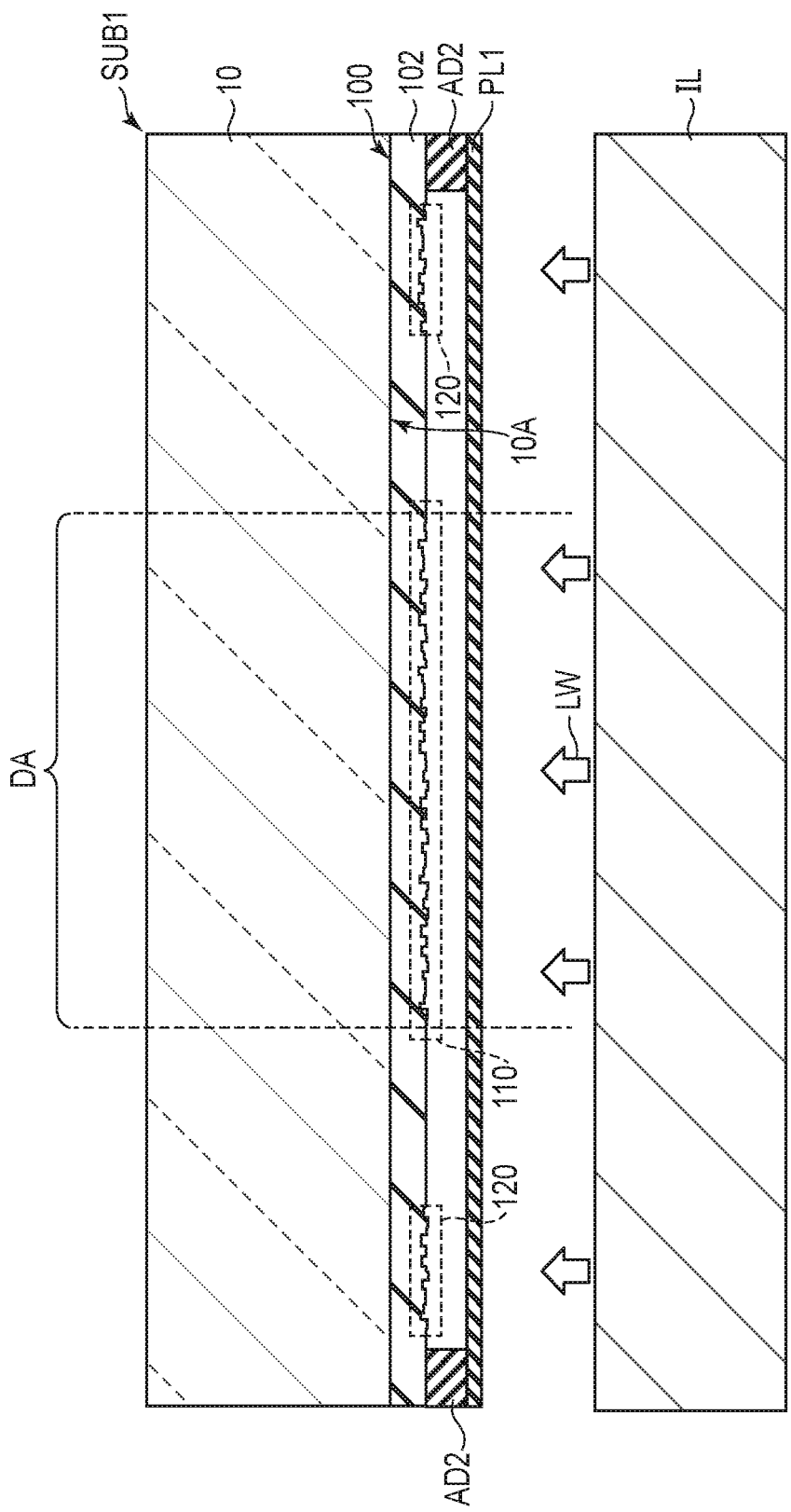
FIG. 12 is a cross-sectional view illustrating a display device DSP of a seventh configuration example.

FIG. 12 is a cross-sectional view illustrating a display device DSP of a seventh configuration example. The seventh configuration example illustrated in FIG. 12 is different from the sixth configuration example illustrated in FIG. 11 in that a color separation element 100 includes a resin layer 102 directly formed on a lower surface 10A of a transparent substrate 10. A first element 110 and second elements 120 are formed on the resin layer 102. A polarizing plate PL1 is bonded to the resin layer 102 by an adhesive AD2.

Even in this seventh configuration example, the same effect as described above can be obtained. In addition, the color separation element 100 can be thinned.

Eighth Configuration Example

Figure 13:
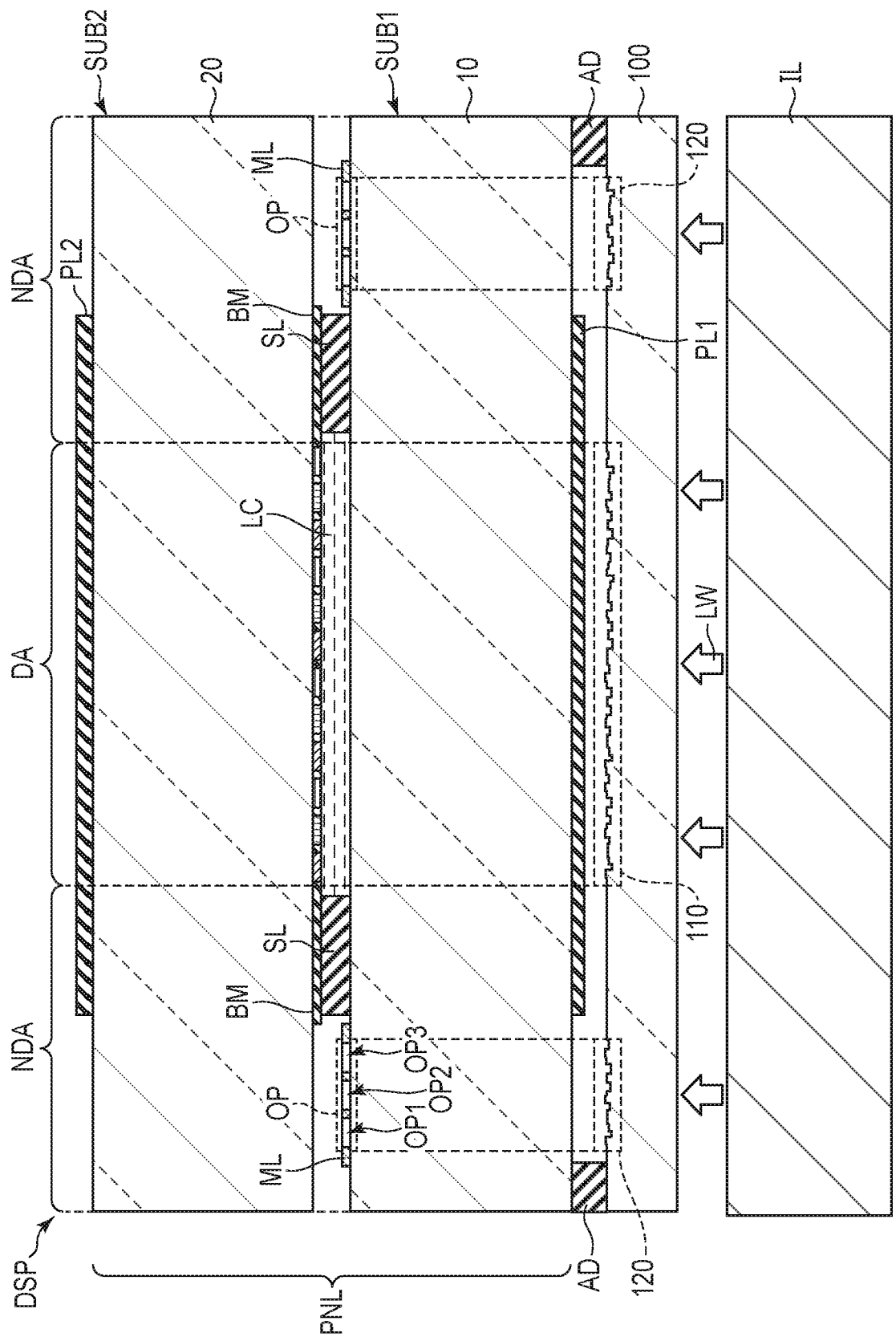
FIG. 13 is a cross-sectional view illustrating a display device DSP of an eighth configuration example.

FIG. 13 is a cross-sectional view illustrating a display device DSP of an eighth configuration example. The eighth configuration example illustrated in FIG. 13 is different from the first configuration example illustrated in FIG. 2 in that a first substrate SUB1 includes metal layers ML and openings OP are through holes formed in the metal layers ML. Each of the metal layers ML may be formed in an island shape not connected to any wiring or electrode, or may be electrically connected to a wiring having a predetermined potential. The metal layer ML is desirably formed of a metal material having relatively low reflectance such as molybdenum.

In the example illustrated in FIG. 13, the openings OP each includes a first opening OP1, a second opening OP2, and a third opening OP3. Second elements 120 each are provided so as to overlap each of the openings OP in the third direction Z. The first substrate SUB1 does not include a light-shielding member such as a metal wiring or an electrode between the second elements 120 and the openings OP.

Even in this eighth configuration example, the same effect as described above can be obtained.

Ninth Configuration Example

FIG. 14 is a cross-sectional view illustrating a display device DSP of a ninth configuration example. The ninth configuration example illustrated in FIG. 14 is different from the eighth configuration example illustrated in FIG. 13 in that a second substrate SUB2 does not overlap openings OP.

Even in this ninth configuration example, the same effect as described above can be obtained. In addition, the openings OP can be observed without passing through the second substrate SUB2.

Tenth Configuration Example; Color Separation Element 100

Figure 15:
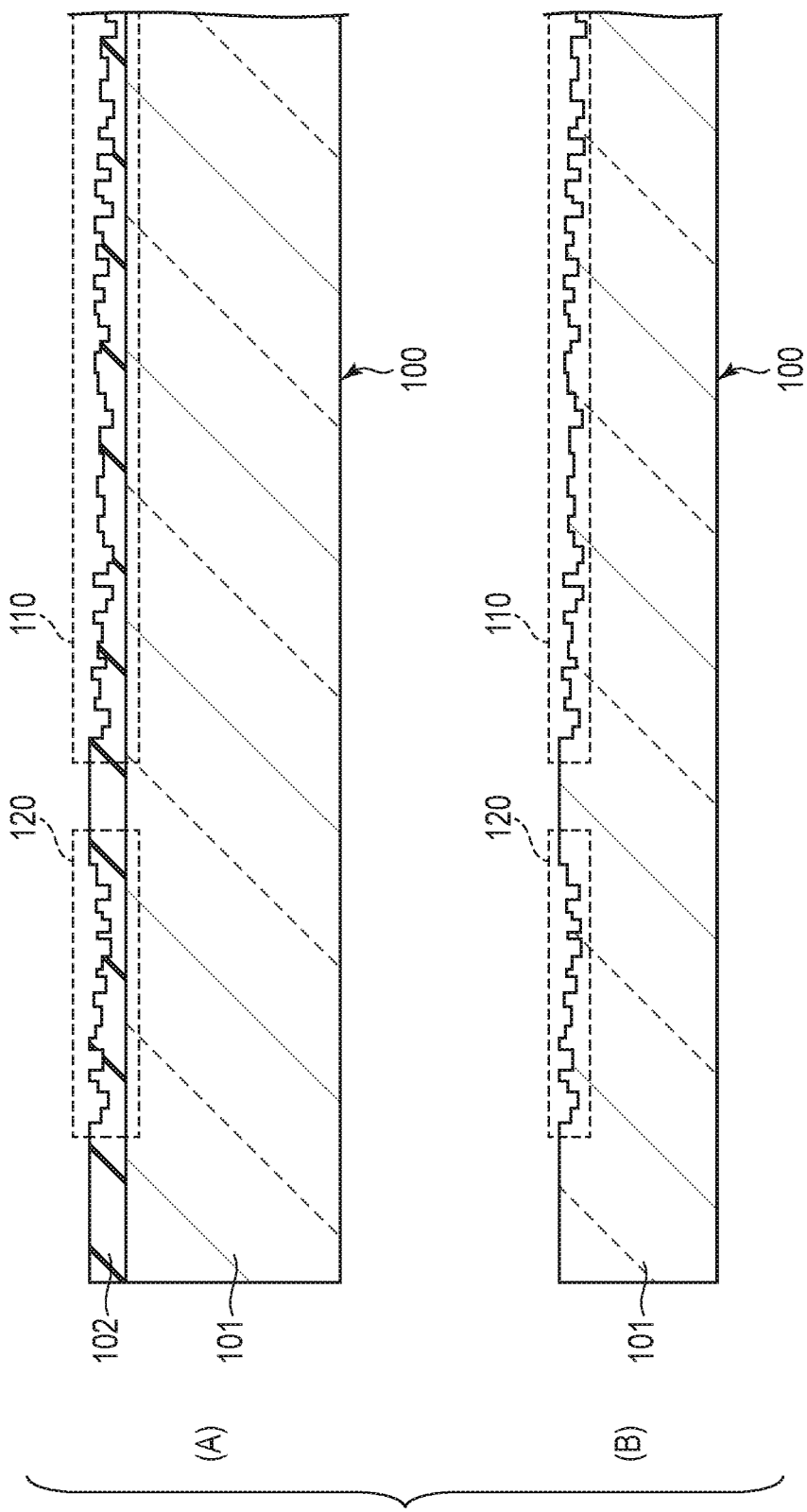
FIG. 15 is a cross-sectional view illustrating a color separation element 100 of a tenth configuration example.

FIG. 15 is a cross-sectional view illustrating a color separation element 100 of a tenth configuration example.

In an example shown in (A) of FIG. 15, the color separation element 100 includes a transparent base material 101 and a transparent resin layer 102. The resin layer 102 is stacked on the transparent base material 101. A first element 110 and second elements 120 are formed on the resin layer 102.

In an example shown in (B) of FIG. 15, the color separation element 100 includes a transparent base material 101. A first element 110 and a second element 120 are formed on a same surface side of the transparent base material 101.

The color separation elements 100 illustrated in (A) and (B) of FIG. 15 are applicable to the first to ninth configuration examples, accordingly.

In each of the above-described configuration examples in which the color separation element 100 is bonded to a first substrate SUB1, from a viewpoint of suppressing deformation of the color separation element 100 and the first substrate SUB1 due to thermal expansion, a thermal expansion coefficient of the transparent base material 101 of the color separation element 100 is desirably equal to a thermal expansion coefficient of a transparent substrate 10 of the first substrate SUB1.

Eleventh Configuration Example

Figure 16:
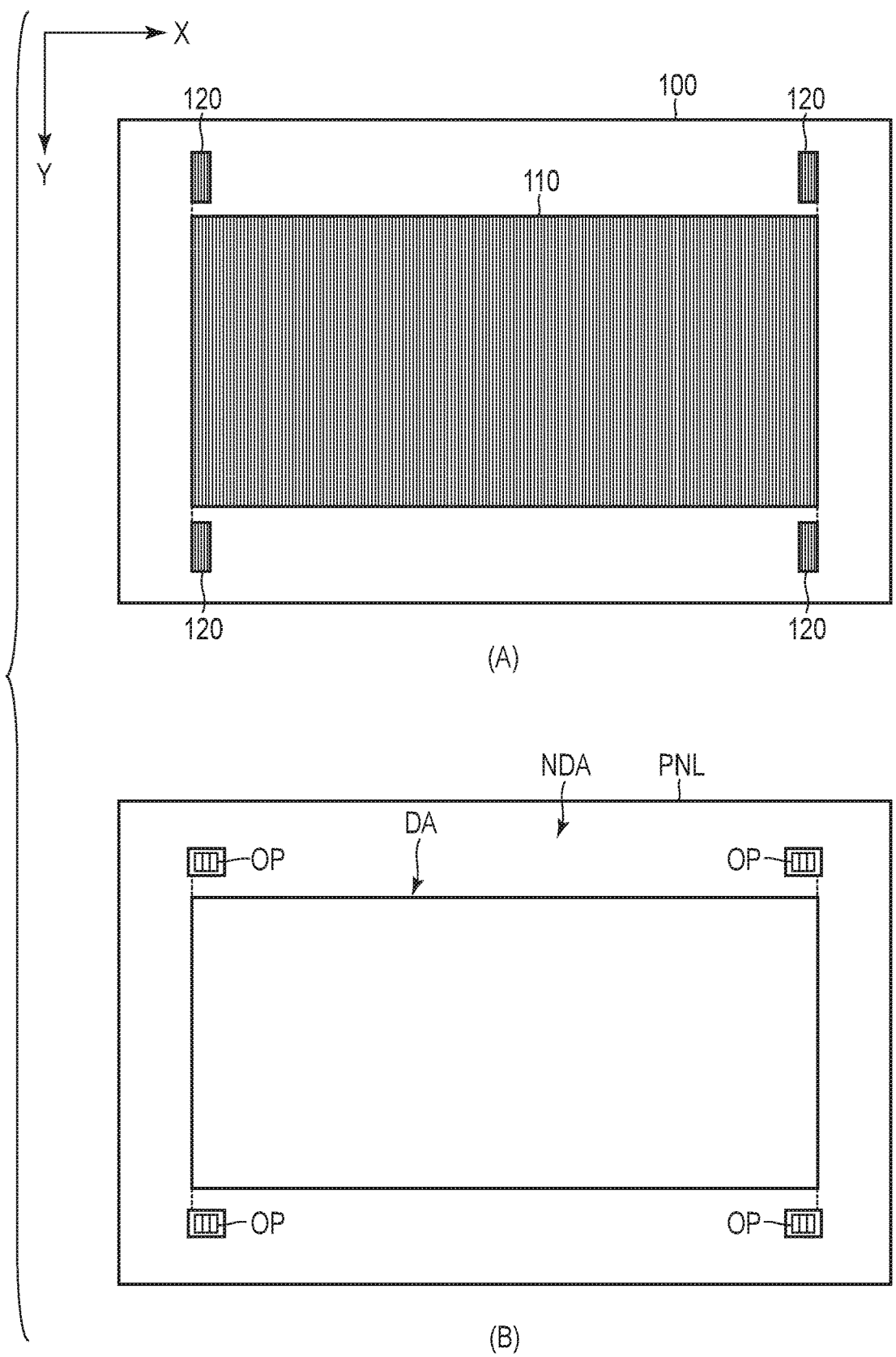
FIG. 16 is a plan view illustrating a color separation element 100 and a display panel PNL of an eleventh configuration example.

FIG. 16 is a plan view illustrating a color separation element 100 and a display panel PNL of an eleventh configuration example. (A) of FIG. 16 illustrates the color separation element 100. Second elements 120 are provided at a plurality of places around a first element 110. In the example illustrated in FIG. 16, the first element 110 is provided over a rectangular region. The second elements 120 are provided near each of the four corners of the first element 110. The first element 110 is located between each pair of the two second elements 120 along the second direction Y.

(B) of FIG. 16 illustrates the display panel PNL. A display portion DA is provided over a region overlapping with a first element 110. Each of openings OP is provided in a region overlapping a second element 120, provided at a plurality of places in a non-display portion NDA. For example, the number of openings OP is the same as the number of second elements 120. When the color separation element 100 and the display panel PNL overlap each other, each of the second elements 120 overlaps each of the opening OP as described with reference to FIG. 2 and the like.

As described above, the alignment of the color separation element 100 and the display panel PNL is performed based on the second elements 120 and the openings OP provided at a plurality of places. Therefore, the alignment can be accurately performed not only in a first direction X and a second direction Y but also in a rotation direction (θ direction) in an X-Y plane. Although FIG. 16 illustrates an example in which the four second elements 120 are provided, it is desirable that at least two second elements 120 are provided in a diagonal direction of the first element 110 from a viewpoint of accurately performing alignment.

Figure 17:
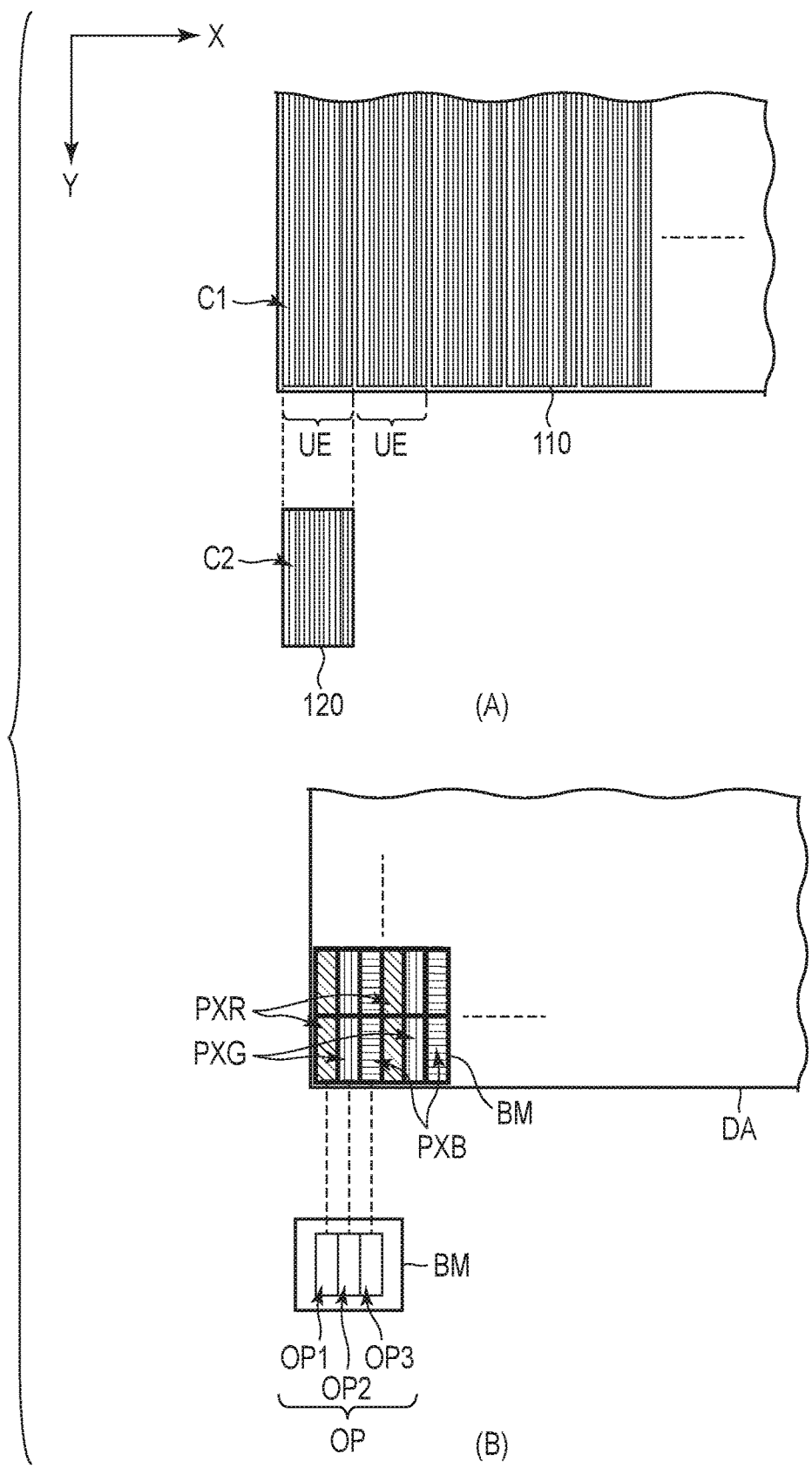
FIG. 17 is an enlarged plan view of the second element 120 and the opening OP illustrated in FIG. 16.

FIG. 17 is an enlarged plan view of the second element 120 and the opening OP illustrated in FIG. 16. (A) of FIG. 17 illustrates a part of a first element 110 and a second element 120. The first element 110 includes a plurality of unit elements UE arranged in the first direction X. An uneven portion C1 in a unit element UE extends along the second direction Y. The second element 120 is provided on a same straight line as the unit element UE of the first element 110. That is, an uneven portion C2 of the second element 120 extends along the second direction Y. The uneven portions C1 and C2 are provided on a same line along the second direction Y and have a same shape. Therefore, when the first element 110 is formed, the second element 120 can be easily formed. In the example illustrated in (A) of FIG. 17, the first element 110 and the second element 120 are separated in the second direction Y, but the first element 110 and the second element 120 may be continuously formed.

(B) of FIG. 17 illustrates pixels PXR, PXG, and PXB and an opening OP. The pixels PXR, PXG, and PXB are arranged in the first direction X and are partitioned by a light-shielding layer BM. In the opening OP, a first opening OP1, a second opening OP2, and a third opening OP3 are arranged in the first direction X. The first opening OP1 and the pixel PXR are provided on a same straight line along the second direction Y. The second opening OP2 and the pixel PXG are provided on a same straight line along the second direction Y. The third opening OP3 and the pixel PXB are provided on a same straight line along the second direction Y.

The alignment between the display panel PNL and the color separation element 100 in the eleventh configuration example is performed such that, in each of the plurality of openings OP, a focused image of the red light LR overlaps the first opening OP1, a focused image of the green light LG overlaps the second opening OP2, and a focused image of the blue light LB overlaps the third opening OP3. That is, when the alignment between the display panel PNL and the color separation element 100 is completed, the red light LR, the green light LG, and the blue light LB are observed to be arranged in this order in the first direction X in all the openings OP. On the other hand, when the display panel PNL and the color separation element 100 are misaligned, the order of the observed colors is different in some of the openings OP.

As described above, by performing alignment based on the plurality of second elements 120 and the plurality of openings OP, alignment between the first element 110 and the pixels PXR, PXG, and PXB can be accurately performed.

Twelfth Configuration Example

Figure 18:
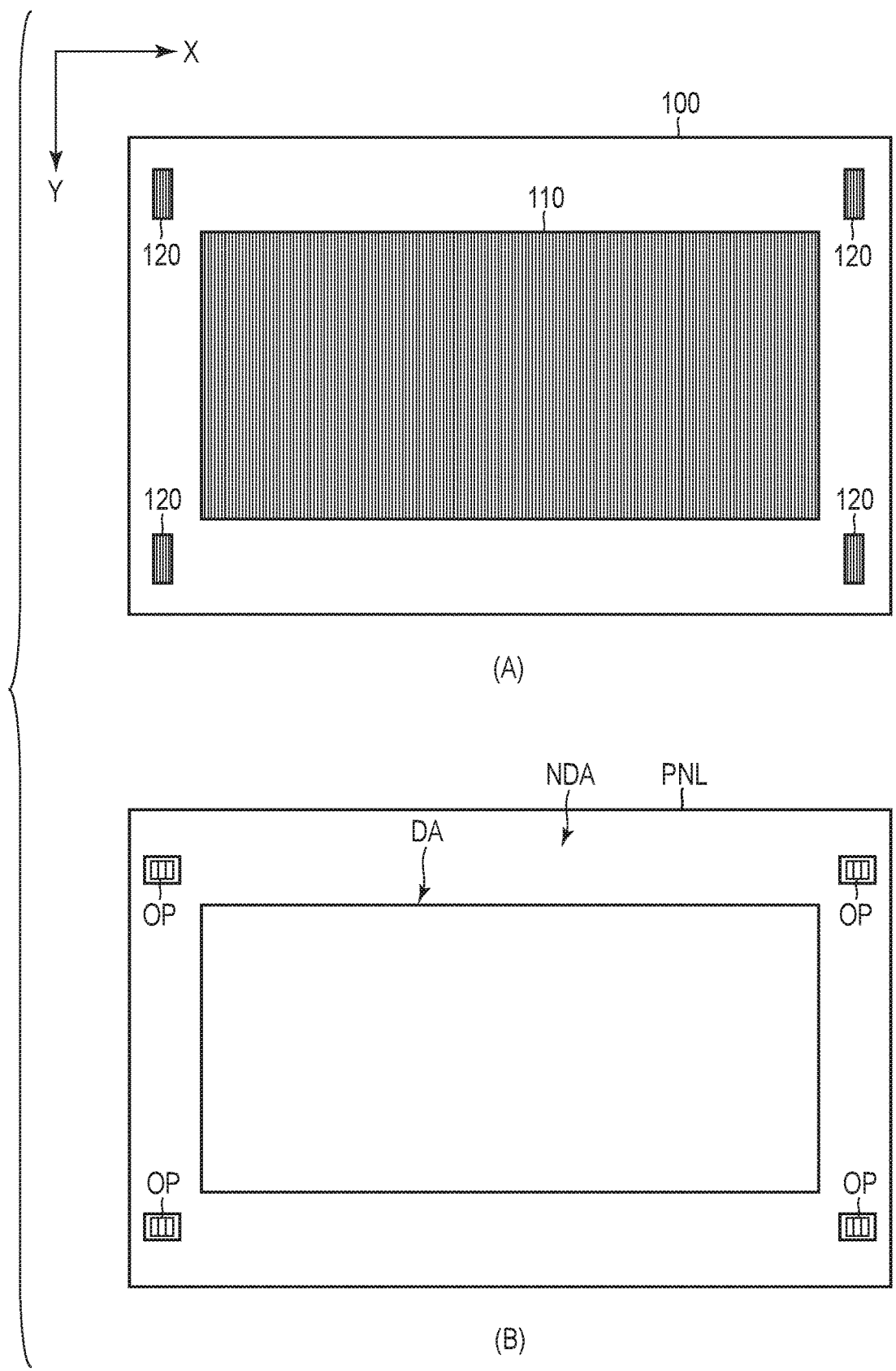
FIG. 18 is a plan view illustrating a color separation element 100 and a display panel PNL of a twelfth configuration example.

FIG. 18 is a plan view illustrating a color separation element 100 and a display panel PNL of a twelfth configuration example. (A) of FIG. 18 illustrates the color separation element 100. The color separation element 100 of the twelfth configuration example is different from the color separation element 100 of the eleventh configuration example in that second elements 120 are shifted in the first direction X with respect to a first element 110. The first element 110 is not positioned between each pair of the two second elements 120 arranged in the second direction Y.

(B) of FIG. 18 illustrates the display panel PNL. A display portion DA is provided over a region overlapping with a first element 110. Each of the openings OP is provided in a region overlapping a second element 120.

Figure 19:
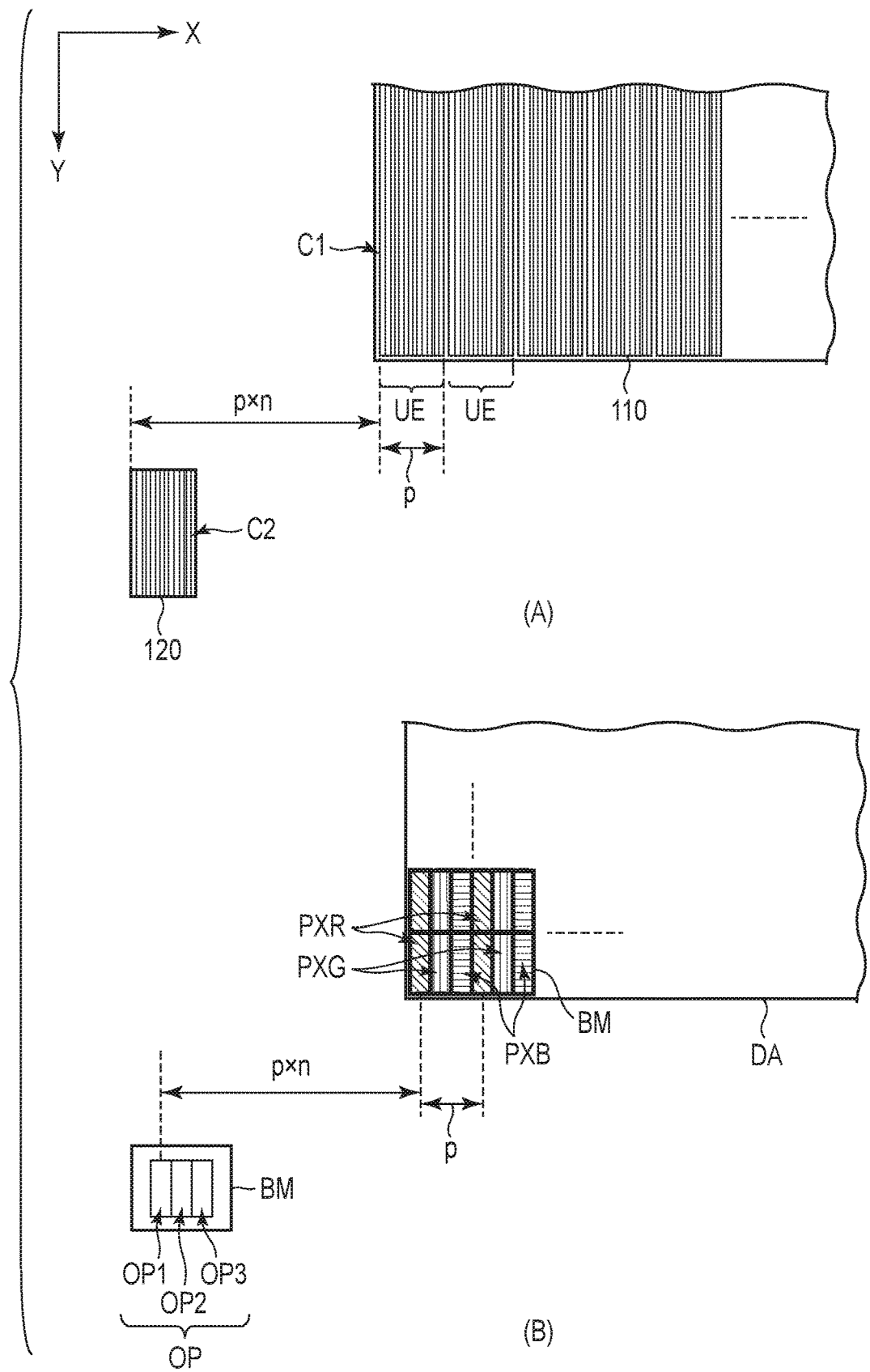
FIG. 19 is an enlarged plan view of the second element 120 and the opening OP illustrated in FIG. 18.

FIG. 19 is an enlarged plan view of the second element 120 and the opening OP illustrated in FIG. 18. (A) of FIG. 19 illustrates a part of the first element 110 and the second element 120. In the first element 110, a plurality of unit elements UE are arranged at a pitch p along the first direction X. The second element 120 is provided at a position away from the first element 110 by a distance of p×n along the first direction X. Note that n is a positive integer. A case where n is 0 corresponds to the eleventh configuration example illustrated in FIG. 17.

(B) of FIG. 19 illustrates pixels PXR, PXG, and PXB and an opening OP. The pixels PXR, PXG, and PXB are arranged in the first direction X. Furthermore, pixels displaying the same color, for example, red pixels PXR are arranged at a pitch p along the first direction X. The pixels PXG and PXB of other colors are also arranged at the same pitch p as the pixel PXR. A first opening OP1 is provided at a position away from the pixel PXR by a distance of p×n along the first direction X. A distance between a second opening OP2 and the pixel PXG and a distance between a third opening OP3 and the pixel PXB are also the same as a distance between the first opening OP1 and the pixel PXR.

Even in this twelfth configuration example, the same effect as described in the eleventh configuration example can be obtained.

Thirteenth Configuration Example; Second Element 120

Figure 20:
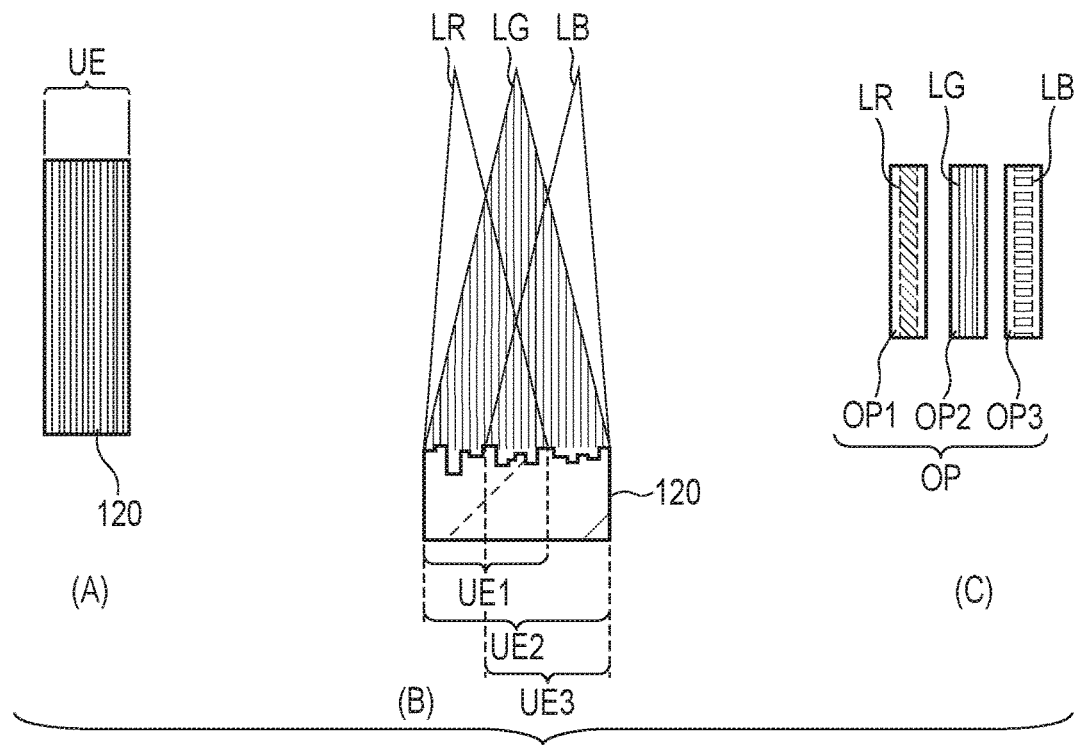
FIG. 20 is a diagram illustrating a second element 120 of a thirteenth configuration example.

FIG. 20 is a diagram illustrating a second element 120 of a thirteenth configuration example.

(A) of FIG. 20 is a plan view of the second element 120. The second element 120 includes the unit element UE for one cycle of the first element 110 illustrated in FIG. 3.

(B) of FIG. 20 is a cross-sectional view of the second element 120. The second element 120 has, for example, a same shape as the second unit element UE2 illustrated in FIG. 3, and mainly diffracts and focuses a green light LG. Note that, as described with reference to FIG. 3, since the second unit element UE2 includes a part of the first unit element UE1, a red light LR is diffracted and focused. Since the second unit element UE2 includes a part of a third unit element UE3, the second unit element UE2 diffracts and focuses a blue light LB. However, an intensity of the red light LR focused by the second unit element UE2 is smaller than that of the first unit element UE1. In addition, an intensity of the blue light LB focused by the second unit element UE2 is smaller than that of the third unit element UE3.

(C) of FIG. 20 is a view illustrating a focused image in an opening OP. In a second opening OP2, a focused image of the green light LG is clearly observed. On the other hand, a focused image of the red light LR in a first opening OP1 and a focused image of the blue light LB in a third opening OP3 are not observed as clear as the focused image of the green light LG because the light intensity is weak. As described above, it is also possible to observe an alignment mark with light of one of the red light LR, the green light LG, and the blue light LB.

Fourteenth Configuration Example; Second Element 120

Figure 21:
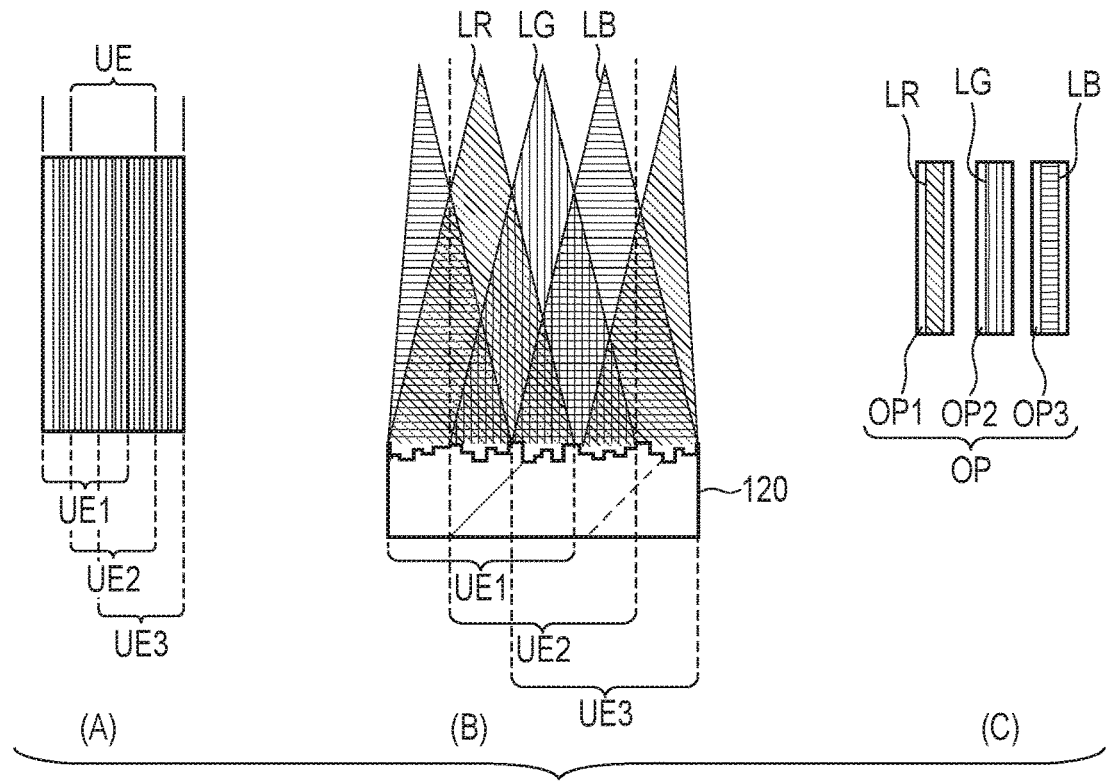
FIG. 21 is a diagram illustrating a second element 120 of a fourteenth configuration example.

FIG. 21 is a diagram illustrating a second element 120 of a fourteenth configuration example.

(A) of FIG. 21 is a plan view of the second element 120. The second element 120 includes unit elements UE for ⅔ cycles in addition to the unit elements UE for one cycle of the first element 110 illustrated in FIG. 3. That is, the second element 120 includes all of first unit elements UE1, all of second unit elements UE2, and all of third unit elements UE3.

(B) of FIG. 21 is a cross-sectional view of second element 120. The second element 120 mainly diffracts and focuses a red light LR in a first unit element UE1, mainly diffracts and focuses a green light LG in a second unit element UE2, and mainly diffracts and focuses a blue light LB in a third unit element UE3. Therefore, an intensity of each of the red light LR, the green light LG, and the blue light LB focused by the second element 120 is maximized.

(C) of FIG. 21 is a view illustrating a focused image in an opening OP. A focused image of the red light LR in a first opening OP1, a focused image of the green light LG in a second opening OP2, and a focused image of the blue light LB in a third opening OP3 are all observed in a clear manner.

Fifteenth Configuration Example; Second Element 120

Figure 22:
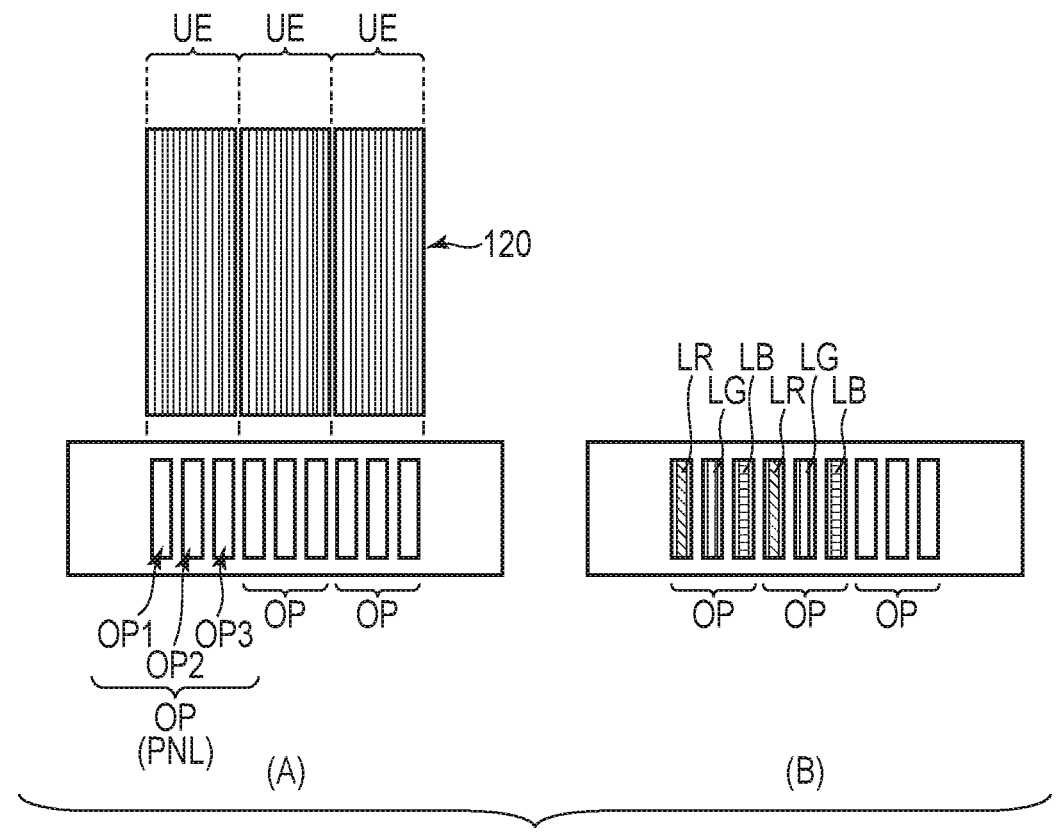
FIG. 22 is a diagram illustrating second elements 120 of a fifteenth configuration example.

FIG. 22 is a diagram illustrating a second element 120 of a fifteenth configuration example.

(A) of FIG. 22 is a plan view illustrating second elements 120 and openings OP. The second elements 120 each includes a unit element UE for three cycles of the first element 110 illustrated in FIG. 3. In the display panel PNL, three (or three cycles) openings OP are formed corresponding to the second element 120. In a case where the second element 120 includes a unit element UE of a plurality of cycles, it is desirable that the opening OP be formed for a cycle similar to that of the second element 120 also in the display panel PNL. When an alignment between the display panel PNL and the color separation element 100 is completed, a red light LR, a green light LG, and a blue light LB are observed to be arranged in this order in the first direction X in all the openings OP.

On the other hand, when the display panel PNL and the color separation element 100 are shifted by one cycle in the first direction X, as illustrated in (B) of FIG. 22, a focused image is not observed in some openings OP. As a result, even if the red light LR, the green light LG, and the blue light LB are observed to be arranged in this order in the first direction X, it can be determined whether or not a shift corresponding to a cycle has occurred.

Sixteenth Configuration Example; Opening OP

Figure 23:
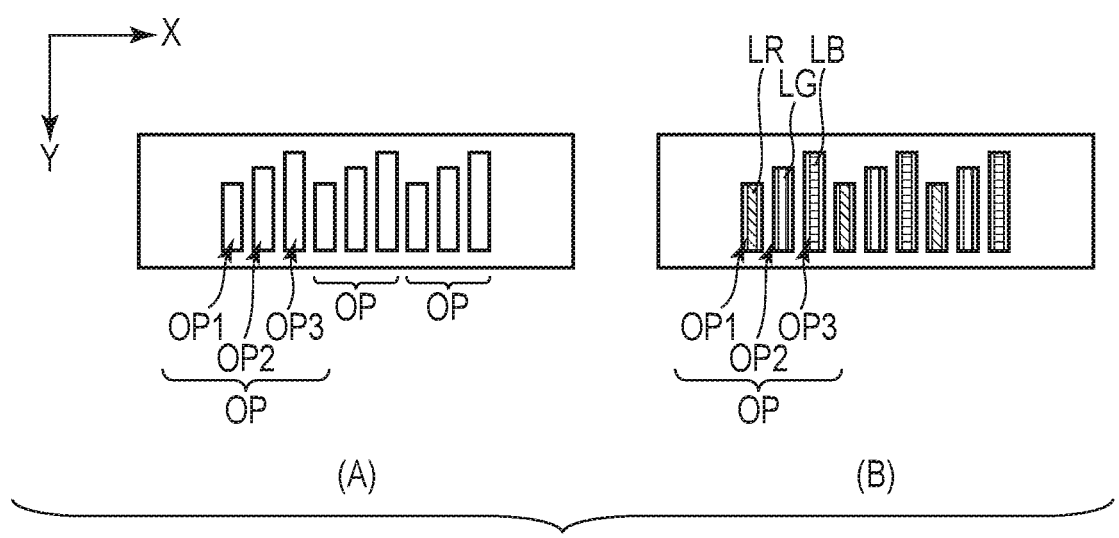
FIG. 23 is a diagram illustrating openings OP of a sixteenth configuration example.

FIG. 23 is a diagram illustrating openings OP of a sixteenth configuration example.

(A) of FIG. 23 is a plan view illustrating an opening OP. The opening OP includes a first opening OP1, a second opening OP2, and a third opening OP3 arranged in the first direction X. Lengths of the first to third openings OP1 to OP3 in the second direction Y are different from each other. In the example illustrated in FIG. 23, the second opening OP2 is longer than the first opening OP1, and the third opening OP3 is longer than the second opening OP2.

(B) of FIG. 23 is a view illustrating a focused image in an opening OP. Lengths in the second direction Y of a focused image of a red light LR in the first opening OP1, a focused image of a green light LG in the second opening OP2, and a focused image of a blue light LB in the third opening OP3 are different from each other. Therefore, the visibility of the focused image of each color can be improved.

As described above, according to the present embodiment, it is possible to provide a display device capable of suppressing deterioration of display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of the display device obtained from the configuration disclosed in the present specification is added below.

(1)

A display device including:

a display panel that includes a display portion including a plurality of pixels and a non-display portion surrounding the display portion;

an illumination device configured to illuminate the display panel; and a color separation element provided between the display panel and the illumination device, in which the display panel includes an opening in the non-display portion, the color separation element includes a first element superimposed on the pixel and a second element superimposed on the opening, the first element separates illumination light from the illumination device into light of a plurality of colors and irradiates the pixel with the light, and the second element separates illumination light from the illumination device into light of a plurality of colors and irradiates the opening with the light.

(2)

The display device according to (1), in which each of the first element and the second element is a diffraction element having an uneven shape.

(3)

The display device according to (1) or (2), in which the display panel includes a first substrate, a second substrate, and a liquid crystal layer located between the first substrate and the second substrate, the first substrate is provided between the color separation element and the second substrate, and the first element and the second element are formed on a side facing the first substrate in the color separation element.

(4)

The display device according to (3), further including:

an adhesive that bonds the color separation element and the first substrate to each other; and a polarizing plate provided between the color separation element and the first substrate, in which the polarizing plate is bonded to the first substrate, and a thickness of the adhesive is larger than a thickness of the polarizing plate.

(5)

The display device according to (3), further including:

an adhesive that bonds the color separation element and the first substrate to each other; and a polarizing plate, in which the color separation element is provided between the polarizing plate and the first substrate, and the polarizing plate is bonded to the color separation element.

(6)

The display device according to (1) or (2), in which the display panel includes a first substrate, a second substrate, and a liquid crystal layer located between the first substrate and the second substrate, the first substrate is provided between the color separation element and the second substrate, and the first element and the second element are formed on an opposite side of a side facing the first substrate in the color separation element.

(7)

The display device according to (6), further including a polarizing plate provided between the color separation element and the first substrate.

(8)

The display device according to (6), further including a polarizing plate, in which the color separation element is provided between the polarizing plate and the first substrate.

(9)

The display device according to any one of (3) to (8), in which the second substrate includes a light-shielding layer, and the opening is a through hole formed in the light-shielding layer.

(10)

The display device according to any one of (3) to (8), in which the first substrate includes a metal layer, and the opening is a through hole formed in the metal layer.

(11)

The display device according to (9) or (10), in which the first substrate does not include a light-shielding member between the second element and the opening.

(12)

The display device according to any one of (1) to (11), in which the color separation element includes a transparent base material and a resin layer stacked on the transparent base material, and the first element and the second element are formed on the resin layer.

(13)

The display device according to any one of (1) to (11), in which the color separation element includes a transparent base material, and the first element and the second element are formed on a same surface side of the transparent base material.

(14)

The display device according to any one of (1) to (13), in which the second element is provided at a plurality of places around the first element.

(15)

The display device according to any one of (1) to (14), in which the first element has a periodic uneven shape, and the second element has an uneven shape identical to a unit element of at least one cycle of the first element.

(16)

The display device according to any one of (1) to (15), in which the opening includes a first opening and a second opening aligned in a first direction, and a length of the first opening in a second direction intersecting the first direction is different from a length of the second opening in the second direction.

What is claimed is:

1. A display device comprising:
   a display panel including a display portion and a non-display portion surrounding the display portion;
   an illumination device; and
   a color separation element provided between the display panel and the illumination device,
   wherein the color separation element separates illumination light from the illumination device into light of a plurality of colors,
   the color separation element is a diffraction element having an uneven shape, and
   a first opening and a second opening are formed in the non-display portion of the display panel, overlap the color separation element, and are aligned in a first direction.

2. The display device according to claim 1, wherein the color separation element includes a transparent base material and a resin layer stacked on the transparent base material.

3. The display device according to claim 1, wherein
   the color separation element includes a first element and a second element,
   the first element has a periodic uneven shape, and
   the second element has an uneven shape identical to a unit element of at least one cycle of the first element.

4. The display device according to claim 3, wherein
   the color separation element includes a transparent base material, and
   the first element and the second element are formed on a same surface side of the transparent base material.

5. The display device according to claim 3, wherein the second element is provided at a plurality of places around the first element.

6. The display device according to claim 1, wherein a length of the first opening in a second direction intersecting the first direction is different from a length of the second opening in the second direction.

7. The display device according to claim 1, wherein
   the display panel further includes a sealant in the non-display portion, and
   the first opening and the second opening are located outside the sealant.

8. The display device according to claim 1, wherein
   the display panel further includes a light-shielding layer, and
   the first opening and the second opening are formed in the light-shielding layer.

* * * * *